US012762382B1

(12) United States Patent
Yates et al.

(10) Patent No.: US 12,762,382 B1
(45) Date of Patent: Oct. 13, 2026

(54) GENERATIVE MODEL EVALUATION AND IMPROVEMENT PIPELINE

(71) Applicant: Dropbox, Inc., San Francisco, CA (US)

(72) Inventors: Andrew Donald Yates, San Francisco, CA (US); Daniel Bosnic Hill, Bellevue, WA (US); Hans Sayyadi, Lafayette, CO (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/376,115

(22) Filed: Oct. 31, 2025

(51) Int. Cl.
*G06N 3/0475* (2023.01)
*G06F 16/3329* (2025.01)
*G06F 40/30* (2020.01)

(52) U.S. Cl.
CPC ..... *G06N 3/0475* (2023.01); *G06F 16/33295* (2025.01); *G06F 40/30* (2020.01)

(58) Field of Classification Search
CPC ........................ G06N 3/0474; G06F 16/33295
See application file for complete search history.

(56) References Cited

U.S. PATENT DOCUMENTS 6,893,735 B2 5/2005 Acharya et al.
7,517,879 B2 4/2009 Chan et al.
7,873,523 B2 1/2011 Potter et al.
9,496,987 B2 11/2016 Naaman et al.
9,503,220 B2 11/2016 Naaman et al.
10,361,989 B2 7/2019 Bastide et al.
2009/0155335 A1 6/2009 O'Shaughnessey et al.
2009/0281791 A1 11/2009 Li
2019/0258528 A1 8/2019 Yeung et al.
2019/0362020 A1 11/2019 Paulus et al.
2025/0036695 A1* 1/2025 De Barros .............. G06F 9/451
2025/0321866 A1* 10/2025 Mysore ............... G06F 11/3688
2025/0371284 A1* 12/2025 McCurdy ................ G06F 40/40
2026/0030476 A1* 1/2026 Chandrasekaran .... G06N 3/004
2026/0044555 A1* 2/2026 Kelly ...................... G06F 16/35

OTHER PUBLICATIONS

Ossowski, Timothy, and Junjie Hu. "Multimodal prompt retrieval for generative visual question answering." arXiv preprint arXiv: 2306.17675 (2023). (Year: 2023).*
Madaan, Aman, et al. "Memory-assisted prompt editing to improve GPT-3 after deployment." arXiv preprint arXiv:2201.06009 (2022). (Year: 2022).*

* cited by examiner

*Primary Examiner* — Hal Schnee
(74) *Attorney, Agent, or Firm* — Keller Preece PLLC

(57) ABSTRACT

This disclosure describes systems that evaluating generative queries and modifying generative models (e.g., large language models or LLMs) and/or their system prompts based on the evaluation. The disclosed systems can generate and maintain a generative model functionality codex that stores tags for prompts and responses (to capture behaviors and intents of users and LLMs or other generative models). Using the codes, the disclosed systems can update evaluation model generation and can update queries and/or model parameters based on the evaluation. The disclosed systems can further distill models using updated queries and/or learned model parameters.

20 Claims, 13 Drawing Sheets

GENERATIVE MODEL EVALUATION AND IMPROVEMENT PIPELINE

BACKGROUND

Advancements in large language models (LLMs) and generative artificial intelligence (AI) systems in general have given rise to a variety of innovations in processing and evaluating generative queries. For example, advancements in query evaluation have enabled modification of LLM system prompts to influence how LLMs respond to user queries. Further, existing systems provide access to evaluation mechanisms, classifiers, and other tools that can be applied when updating prompts or models. Despite these capabilities, existing systems suffer from a variety of technical deficiencies, especially regarding operational flexibility, computational efficiency, and data security.

As just noted, conventional systems are often inflexible. In particular, conventional systems rely on static keyword rules or global rubrics to decide whether a response should be accepted, flagged, or rejected. In addition, existing systems generally treat evaluations as fixed input-output mappings, applying predetermined comparisons between queries and expected references such as summaries, answers, or citation formats. Once configured, existing systems generally apply evaluation parameters uniformly across all queries. While such approaches provide a baseline measure of quality, they are rigidly fixed to predefined definitions and cannot adapt to changing context or provide further reasoning. Consequently, such static approaches often overlook nuanced or domain-specific risks, which can lead to potential data leakage or unauthorized access to sensitive content.

Due at least in part to their inflexible natures, existing systems are often computationally inefficient. For example, by applying uniform evaluation protocols indiscriminately, conventional systems create significant amounts of computational overhead, running evaluation protocols on models or programs that are irrelevant or incompatible. Indeed, the static nature of the parameters used by conventional systems frequently leads to mismatches between the evaluation being applied and the query (or model or program) being evaluated, thereby wasting computational resources and introducing potential vulnerabilities in data security and compliance oversight. Compounding these inefficiencies, conventional pipelines frequently route every query, simple or complex, to heavyweight, general-purpose LLMs. By implementing a "largest-model-by-default" approach, conventional systems cause unnecessary latency, GPU memory, and cost on routine tasks that could be satisfied by lighter LLMs.

As a result of the inefficiencies described above, conventional systems often generate poorly adapted modifications to system prompts. Because conventional systems apply evaluation parameters uniformly and without regard to query-specific context, conventional systems often generate prompt modifications that include unnecessary instructions, redundant constraints, or irrelevant guidance. These over-extended or mismatched prompts increase the size and complexity of the instructions supplied to LLMs, causing increased latency, inflated token usage, and overall waste of computational resources without proportionate gains in evaluation accuracy.

Further, conventional evaluation techniques offer little visibility into how decisions are made or why particular evaluation protocols fail. This limited transparency complicates the identification and generation of appropriate evaluation protocols for a query, as well as calibration of those protocols. In practice, conventional systems are forced to either over-apply evaluation protocols, consuming significant computational resources, or under-apply them, risking harmful or insecure outputs.

In addition to these deficiencies, conventional systems introduce significant data security shortcomings. For example, when evaluation parameters are applied uniformly, existing systems may evaluate high-risk queries with the same parameters as routine queries, leading to exposure of confidential information or inadvertent leakage through model outputs. Furthermore, due to lack of visibility, conventional systems can process harmful queries without sufficient scrutiny. Indeed, given these limitations of conventional systems, conventional systems are often unable to adequately evaluate queries and generate modified system prompts for LLMs.

SUMMARY

Embodiments of the present disclosure provide systems, non-transitory computer-readable media, and methods for evaluating generative queries and modifying generative models (e.g., large language models or LLMs) and/or their system prompts based on the evaluation. In particular, the disclosed systems can generate and maintain a generative model functionality codex that stores tags for prompts and responses (to capture behaviors and intents of users and LLMs or other generative models). Furthermore, the disclosed systems can evaluate the performance of a generative model in generating a response to a prompt (or query) according to one or more evaluation tags (from the codex) that align with an intent of the prompt. Indeed, the disclosed systems can generate model context for the generative model using an evaluation tag from the codex, specifically extracting an output rubric and execution instructions (from the codex) for the evaluation tag. Using the evaluation tag, the disclosed systems can generate an evaluation data object indicating a measure of success of the generative model in creating the generative output. In one or more implementations, the disclosed systems generate and maintain a function log that records comparisons between the query and tags in the generative model functionality codex as well as a quality log that records performance metrics of the generative model (e.g., latency, token usage, computational cost). In one or more cases, the disclosed systems process the function and quality logs to produce updated execution instructions, which the disclosed systems use to update the tags stored in the generative model functionality codex and/or to distill models to replicate learned model behavior.

Additional features and advantages of one or more embodiments of the present disclosure are outlined in the description which follows, and may be learned by the practice of such example embodiments.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

This disclosure describes one or more embodiments of a query evaluation system 100 that evaluates generative queries and modifies generative models (e.g., LLMs) and/or system prompts to improve generative outputs of a generative model. In particular, the query evaluation system 100 uses an evaluation architecture that includes a generative model functionality codex, a query router, and one or more generative models for execution and evaluation. Using this architecture, the query evaluation system 100 matches generative queries to tags by comparing the generative queries to parameters of evaluation tags stored in the generative model functionality codex. Furthermore, based on the matching tags, the query evaluation system 100 generates an evaluation tag and modifies a system prompt of a generative model to include one or more parameters, rubrics, or execution instructions of the evaluation tag. The query evaluation system 100 then provides the modified system prompt to a generative model to generate an output.

Moreover, the query evaluation system 100 generates an evaluation data object that measures the success of the generative model in generating the output according to the parameters, rubrics, or execution instructions of the modified system prompt. Additionally, the query evaluation system 100 records how the matching evaluation tags were determined in a function log and records performance metrics of the generative model in generating the output in a quality log. Finally, the query evaluation system 100 updates the tags stored in the generative model functionality codex based on the function log and the quality log.

Figure 1:
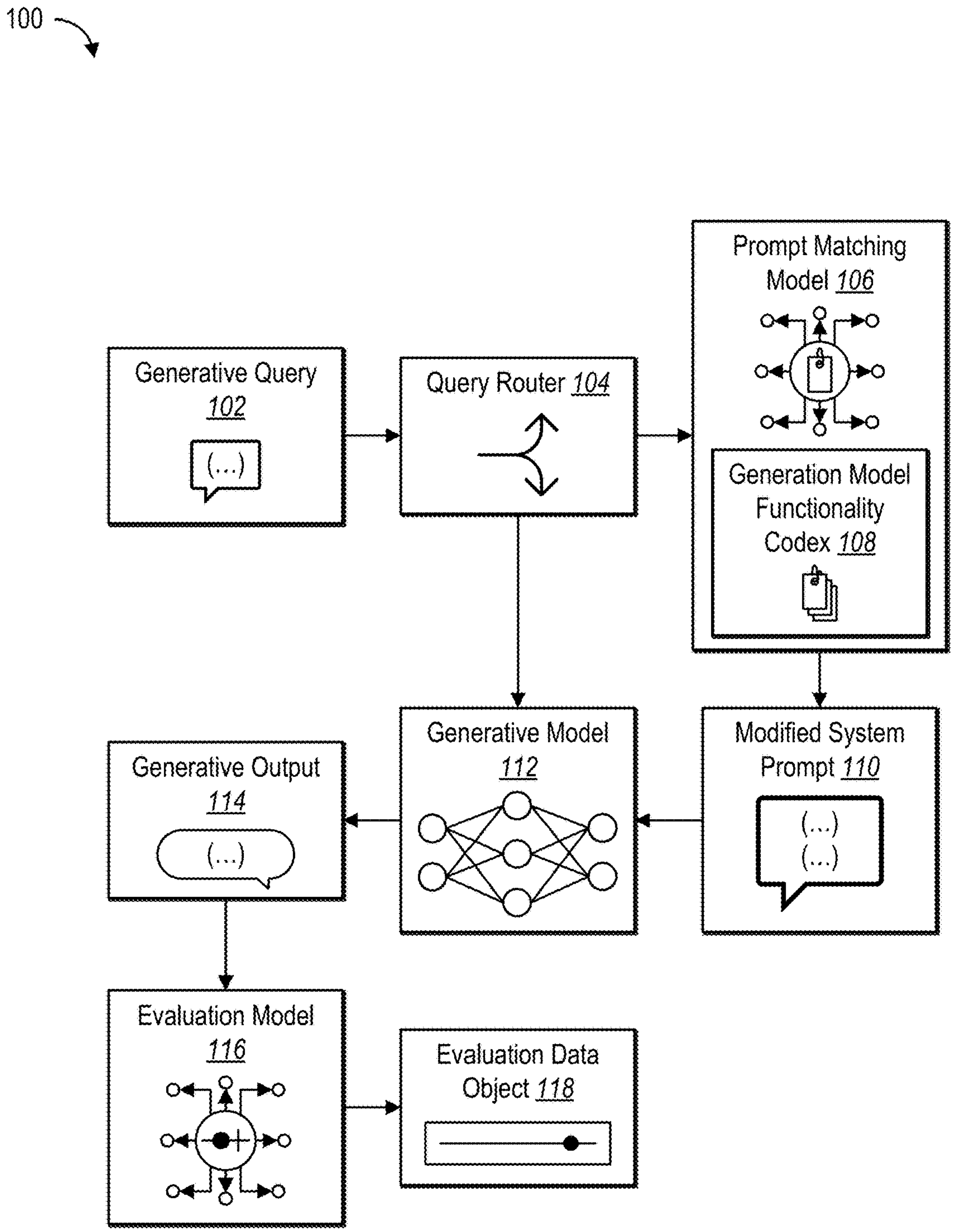
FIG. 1 illustrates an overview of a query evaluation system using a generative model to generate a generative output based on a modified system prompt and an evaluation model to generate an evaluation data object corresponding to the generative output in accordance with one or more embodiments.

As just mentioned, the query evaluation system 100 can improve generative outputs of generative models by modifying system prompts and/or model parameters according to evaluation data objects. FIGS. 1-8 provide more information regarding how the query evaluation system 100 modifies system prompts of generative models and generates evaluation data objects. Specifically, FIG. 1 illustrates an example overview of the query evaluation system 100 using a generative model to generate an evaluation data object based on a modified system prompt in accordance with one or more embodiments. Additional detail regarding the acts and processes introduced in relation to FIG. 1 is provided thereafter with reference to subsequent figures.

As shown in FIG. 1, the query evaluation system 100 can receive a generative query 102. In one or more embodiments, the query evaluation system 100 can provide the generative query 102 to a query router 104. Furthermore, the query evaluation system 100 can use the query router 104 to provide the generative query 102 to a prompt matching model 106 and the generative model 112. Moreover, the prompt matching model 106 can match an evaluation tag to the generative query 102 by comparing the generative query 102 to evaluation tags stored in the generative model functionality codex 108. In addition, the prompt matching model 106 can determine (from the generative model functionality codex 108) evaluation tag parameters, such as expected inputs, expected outputs, rubrics, success cases, and execution instructions associated with the matched evaluation tag.

Furthermore, the query evaluation system 100 can utilize the prompt matching model 106 to generate a modified system prompt 110 based on the matched evaluation tag. For example, the prompt matching model 106 can combine an initial system prompt of the generative model 112 with the parameters of the matched evaluation tag to form the modified system prompt 110.

Additionally, the query evaluation system 100 can provide the modified system prompt 110 to the generative model 112. In one or more embodiments, the query evaluation system 100 uses the generative model 112 to process the generative query 102 and the modified system prompt 110. For example, the modified system prompt 110 can guide the generative model 112 to generate outputs according to the modified system prompt 110 (which captures the generative query 102 in addition to the evaluation tag parameters of the matched evaluation tag).

In some cases, the query evaluation system 100 provides the generative output 114 to an evaluation model 116. Furthermore, query evaluation system 100 can use the evaluation model 116 to generate an evaluation data object 118. For example, the evaluation model 116 can process the generative output 114 according to the parameters provided by the modified system prompt 110. In certain embodiments, the evaluation data object 118 indicates whether the generative output 114 satisfies one or more expected outputs, thresholds, rubrics, or success cases provided by the modified system prompt 110.

As suggested by the foregoing discussion, the query evaluation system 100 provides a variety of technical advantages relative to conventional systems. For example, through matching tags stored in a generative model functionality codex to generative queries, the query evaluation system 100 improves operational flexibility compared to conventional approaches. For example, rather than relying on static keyword rules or global rubrics, the query evaluation system 100 can dynamically select one or more tags responsive to a particular generative query. Therefore, unlike conventional systems that treat evaluations as fixed input-output mappings and apply predetermined comparisons uniformly, the query evaluation system 100 adapts evaluation parameters to changing query context (and intent) and can incorporate layered reasoning steps. In doing so, the query evaluation system 100 applies acceptance, flagging, and/or rejection criteria as well as safety checks only where appropriate, thereby reducing indiscriminate computation and preventing potential data leakage and unauthorized access to sensitive content.

In addition, due at least in part to the improvements in operational flexibility compared to conventional systems, the query evaluation system 100 can improve computational efficiency compared to conventional systems. For example, by applying evaluation protocols selectively (e.g., only matching evaluation tags to queries for which the matched evaluation tags indicate a need), the query evaluation system 100 reduces unnecessary processing, bandwidth, and storage utilization. Moreover, by aligning parameters of evaluation tags to generative queries, the query evaluation system 100 decreases mismatches between evaluation tags and generative queries and runs evaluation protocols on models or programs that are relevant and compatible, thereby reducing wasted computation and mitigating vulnerabilities associated with misapplied evaluation protocols. Further, the query evaluation system 100 improves computational efficiency of generative models by distilling model knowledge from heavy models into lighter models. In particular, the query evaluation system 100 can use matched evaluation tags, execution instructions, and recorded input-output-metric as supervised signals to train and validate smaller models, thereby reducing latency, GPU memory, and cost on routine tasks.

In addition, the query evaluation system 100 improves the relevance and compactness of prompt modifications. Because the query evaluation system 100 generates the modified system prompt using parameters associated with the matched evaluation tags, the query evaluation system 100 can omit unnecessary instructions and redundant constraints while including parameters that are pertinent to specific generative queries. Thus, the query evaluation system 100 reduces context token usage, lowers latency, and improves overall computational efficiency without sacrificing evaluation accuracy.

Furthermore, the query evaluation system 100 increases transparency of evaluation behavior. For example, the query evaluation system 100 can record how evaluation tags are generated within a function log and record performance metrics of generative model outputs under the modified system prompt within a quality log. The query evaluation system 100 can use these logs to support inspection, debugging, and tuning of evaluation parameters and thresholds, enabling tailored evaluation protocols.

Additionally, the query evaluation system 100 enhances data security and compliance controls. By classifying queries against risk-aware evaluation tags and applying corresponding execution instructions (e.g., redaction, citation enforcement, access checks, or refusal patterns), the query evaluation system 100 can treat high-risk queries more carefully than routine queries. Specifically, by using a generative model functionality codex 108 to store tags with execution instructions and output rubrics having different levels of constraints and thresholds corresponding to different risk-level categories, the query evaluation system 100 can flexibly evaluate prompts on a per-tag basis rather than applying a one-size-fits-all protocol. Thus, the query evaluation system 100 reduces exposure of confidential information and prevents inadvertent leakage through model outputs.

As illustrated by the foregoing discussion, the present disclosure utilizes a variety of terms to describe features and benefits of the query evaluation system 100. Additional detail is hereafter provided regarding the meaning of these terms as used in this disclosure. As used herein, the term "digital content item" (or sometimes simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times. In some embodiments, a digital content item can include a saved work state within an application and/or webpage of client device. Further, in some embodiments, a digital content item can include a generative model chat (or data of a chat) between a user account and a generative model.

As used herein, the term "generative model" refers to any machine-learning model configured to synthesize new outputs by sampling from a learned probability distribution over data, optionally conditioned on prompts, context, or other inputs. Generative models can include, without limitation: large language models (LLMs) that generate text or code; vision-language models that accept and/or produce multimodal inputs and outputs (e.g., text-image pairs); variational autoencoders; generative adversarial networks; and diffusion or score-based models. In some cases, a generative model can be autoregressive or latent-variable, single- or multi-modal, deterministic or stochastic at inference time, and can output text, images, audio, video, code, or intermediate representations (e.g., embeddings). Furthermore, a generative model can encompass variants such as fine-tuned, distilled, pruned, quantized, or ensembled versions, and deployments on device or in networked (e.g., cloud) environments.

In addition, the term "large language model" (or "LLM") refers to a set of one or more machine learning models trained to perform computer tasks to generate or identify computing code and/or data in response to trigger events (e.g., user account interactions, such as text queries and button selections). In particular, a large language model can be a neural network (e.g., a deep neural network) with many parameters trained on large quantities of data (e.g., unlabeled text) using a particular learning technique (e.g., self-supervised learning). A large language model can be trained on a vast corpora of text data to generate, analyze, and understand human language by predicting the probability distribution of sequences of words or tokens. Through extensive parameterization, typically involving billions of adjustable weights, a large language model can encode statistical patterns, semantics, and contextual relationships, enabling the model to perform a wide range of natural language processing tasks—such as text generation, summarization, translation, and question answering—with high fluency and adaptability, while being deployable across diverse computational environments for both training and inference.

Relatedly, as used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, and Bayesian networks. In some embodiments, the query evaluation system 100 utilizes a machine learning model in the form of a neural network, such as a large language model.

Along these lines, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs based on a plurality of inputs provided to the neural network. In some cases, a neural network refers to an algorithm (or a set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, an LLM, or a generative neural network.

Furthermore, as used herein, the term "generative model functionality codex" refers to a centralized or distributed repository that stores and manages tags used by the query evaluation system 100. In some embodiments, the generative model functionality codex is a version-controlled library (e.g., a GitHub repository) that holds tags as executable specifications. In some cases, the generative model functionality codex is a single source for AI execution, evaluation, documentation, and updating of tags.

In addition, the term "evaluation tag" (or sometimes simply "tag") refers to a machine-readable specification (e.g., a single markdown file) or data object that defines how a class of queries and/or model outputs are to be detected, guided, and assessed. An evaluation tag can include evaluation parameters that define or dictate model behavior and/or evaluation requirements of a generative model when using the tag.

Relatedly, as used herein, the term "evaluation tag parameters" (or sometimes simply "tag parameters") refers to a set of structured attributes belonging to a tag that define how the tag is identified, matched, executed, and assessed. To elaborate, tag parameters can include one or more of: (i) identification metadata (name, version, provenance); (ii) applicability conditions or matching parameters (e.g., keywords, semantic features, risk indicators), (iii) a trigger that performs intent detection (e.g., via an LLM or lightweight classifier); (iv) expected inputs and expected context; (v) execution instructions (e.g., order of operations, auxiliary prompts, tool/policy invocations, safety checks, prescribed actions to take upon success or failure of a generative model in generating an output); (vi) an expected output including an evaluation rubric, metrics, thresholds, and success/failure criteria; (vii) dependency rules that enforce an order of priority and conflict-resolution with other tags; and (viii) logging directives for function and quality records.

Moreover, the term "intent tag" refers to a tag that encodes a user's goal for a given turn (e.g., find & retrieve, summarize, Q&A). In some cases, an intent tag includes one or more of matching criteria, a trigger for intent detection, a rubric of success for that goal, or execution instructions that determine how other tags may be layered onto the intent tag.

In addition, the term "behavior tag" refers to a tag that specifies one or more domain-specific rules for guiding how an intent is carried out. A behavior tag can include policies, constraints, or operational rules tied to a particular field, workflow, or application domain (e.g., legal compliance requirements, privacy safeguards, citation enforcement, formatting conventions). In some cases, the query evaluation system 100 can layer one or more behavior tags on top of an intent tag to refine or constrain the intent tag. In some cases, a behavior tag can interact with other evaluation tags matched to a generative query to ensure consistent application of domain rules.

Further, the term "dependency tag" refers to a tag type that specifies one or more prerequisite conditions that must be satisfied before a generative model proceeds with execution. In some cases, a dependency tag operates as an input-only validator or precondition gate and therefore does not define an output schema. For example, a dependency tag can perform checks (e.g., whether a user authentication has been confirmed, source retrieval has been completed, required tools are available, a document language has been detected, or input context is within acceptable limits). In one or more implementations, a dependency tag specifies actions for the query evaluation system 100 to take if a prerequisite is unmet (e.g., triggering a retrieval or verification step, invoking a redactor, reordering plan steps, or halting execution with a safe failure or clarification).

Moreover, the term "aspect tag" refers to a tag type that applies cross-cutting overlays that decorate or constrain outputs of a generative model without altering the underlying intent or domain logic. In particular, an aspect tag can include requirements relating to tone, safety, style, length, formatting, or other output characteristics that are applied uniformly across responses. For example, aspect tags may instruct or require a generative model to answer in plain language, enforce a neutral or professional tone, redact sensitive information, or ensure that outputs conform to a schema. Furthermore, an aspect tag can operate independently of a goal defined by an intent tag and the domain rules defined by behavior tags, thereby allowing policies and presentation constraints to be layered consistently across different queries and contexts.

Additionally, the term "tool tag" refers to a tag type that wraps an external service or deterministic function that can be invoked as part of query execution. For example, a tool tag can include integrations such as an identity resolver, date calculation utility, email sender, or vector search engine, and may be callable by a defined string or schema. In one or more implementations, a tool tag specifies an external function, input and output formats thereof, and associated error-handling or fallback behavior.

Further, the term "quality tag" refers to a tag type that defines an expected output of the generative model and provides thresholds and/or rubrics against which that output is evaluated. Specifically, a quality tag can include curated exemplars of desirable responses, scoring criteria, and thresholds that distinguish acceptable, good, and exceptional outputs. For example, a quality tag can include an alignment threshold comprising a predefined value or range that an alignment score of a generative output must meet or exceed in order to be considered successful or acceptable. Further, a quality tag may include formatting rules, factual accuracy requirements, or stylistic benchmarks.

Relatedly, as used herein, the term "execution instructions" refers to directives that define an order of operations, auxiliary prompts, tool or policy invocations, safety checks, and prescribed actions that the query evaluation system 100 and/or a generative model are to perform when processing a generative query 202. The execution instructions can also specify fallback actions in the event of failure, as well as procedures for logging outcomes and enforcing dependency rules.

Furthermore, as used herein, the term "modified system prompt" refers to a system prompt of a generative model that the query evaluation system 100 generated by embedding one or more evaluation tag parameters into an initial system prompt of the generative model. In some embodiments, the modified system prompt incorporates auxiliary prompts, execution instructions, dependency rules, aspect constraints, tool call schemas, and quality rubrics defined by the evaluation tags matched to a generative query.

Additionally, as used herein, the term "prompt matching model" refers to a component of the query evaluation system 100 that merges initial system prompts with evaluation tag parameters by applying applicability conditions, dependency rules, and conflict-resolution logic. In some embodiments, the prompt matching model 310 is implemented as a lightweight classifier or as a generative model that is integrated into the architecture of the query evaluation system 100.

Moreover, as used herein, the term "evaluation data object" refers to a data structure that encodes an alignment score indicating the degree to which a generative output of a generative model conforms to an expected output associated with an evaluation tag. In one or more embodiments, an evaluation data object further includes an indication of whether the alignment score satisfies an alignment threshold. In some implementations, the alignment threshold is embedded in the evaluation data object and originates from the tag parameters of a quality tag stored in a generative model functionality codex. In some cases, an evaluation data object includes a pass/fail indicator, optional component scores per metric, and an explanation of why a generative output did or did not satisfy an alignment threshold.

Further, as used herein, the term "evaluation model" refers to a model trained or configured to assess generative outputs against evaluation tag parameters embedded in modified system prompts, without necessarily producing the generative outputs themselves.

In addition, as used herein, the term "function log" refers to a record created by the query evaluation system 100 for each generative query processed by the query evaluation system 100. For example, the function log can include one or more of: (i) candidate and selected matching tags and associated evaluation tag parameters that the query evaluation system 100 determined in generating an evaluation tag, (ii) data such as similarity scores, classifier probabilities, thresholds applied, and disqualification reasons used by the query evaluation system 100 to generate an evaluation tag, and (iii) execution context metadata including timestamps, query or session identifiers, model or classifier versions, and runtime settings of the query evaluation system 100 during generation of an evaluation tag. In certain implementations, the query evaluation system 100 can redact, hash, or tokenize sensitive data recorded in a function log to support privacy and security.

Furthermore, as used herein, the term "quality log" refers to a record created by the query evaluation system 100 that includes execution-time outcomes and operational measurements produced by one or more generative models within the evaluation architecture of the query evaluation system 100. In some embodiments, the query evaluation system 100 generates entries of the quality log including alignment, success, and rubric scores and sub-scores, pass/fail flags against evaluation thresholds, confidence values, and any rationales emitted by a generative model; timing and resource metrics such as end-to-end latency, token counts (e.g., prompt, completion, total), compute usage; tool-invocation results (e.g., success/partial/failure, retries, traces); and fault data including error classes, messages, and recovery actions taken. Further, the query evaluation system 100 can key each entry by timestamps, a query/session identifier, and the generative model runtime configuration (e.g., model version, temperature, stop sequences).

Moreover, as used herein, the term "execution instruction updater" refers to a generative model within the evaluation architecture of the query evaluation system 100 configured to generate updated execution instructions based on analyzing a function log and a quality log.

In addition, as used herein, the term "distilled model" refers to a compact model generated through a distillation process in which a teacher model (e.g., the main generative model and/or evaluation model) transfers knowledge, behaviors, and evaluation criteria into a smaller student model. In some cases, a distilled model can be a model which incorporates updated evaluation tag parameters and codex policies into its training corpus and optimization objectives, thereby reproducing the alignment behaviors of the teacher while reducing computational cost, latency, and resource requirements. In some cases, the query evaluation system 100 can update evaluation tag parameters and codex policies to guide the teacher model's outputs, such that the student model learns by mimicking responses already constrained or shaped by those parameters and policies. A distilled model can take different forms depending on system requirements, including a compact generative model, a lightweight classifier distilled for fast decisioning, or a deterministic script distilled to enforce codex rules directly.

Figure 2:
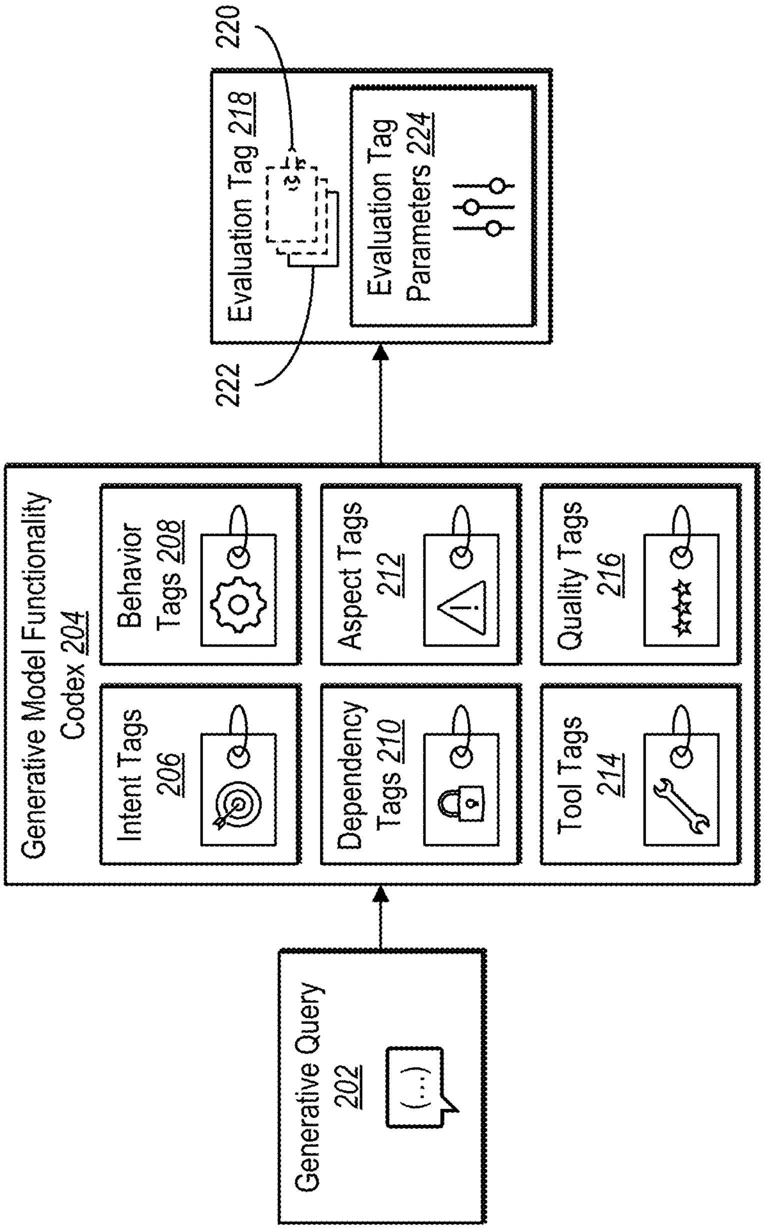
FIG. 2 illustrates the query evaluation system generating an evaluation tag corresponding to a generative query in accordance with one or more embodiments.

As previously mentioned, the query evaluation system 100 can generate an evaluation tag based on matching one or more tags to a generative query. FIG. 2 illustrates the query evaluation system 100 generating an evaluation tag that contains evaluation tag parameters corresponding to a generative query in accordance with one or more embodiments.

As illustrated in FIG. 2, the query evaluation system 100 can compare a generative query 202 to one or more tags stored in a generative model functionality codex 204. In some cases, the tags stored in the generative model functionality codex 204 each contain one or more of execution instructions, rubrics, or thresholds.

In one or more embodiments, the query evaluation system 100 can match one or more tags stored in the generative model functionality codex 204 to the generative query 202. For instance, the query evaluation system 100 can match one or more tags stored in the generative model functionality codex 204 by determining which of the tags align most closely with the applicability conditions or semantic features (or intent) of the tag parameters of generative query 202. In particular, the query evaluation system 100 can determine alignment using keyword matching, vector similarity, or classifier predictions. For example, the query evaluation system 100 can match a generative query 202 such as "summarize document" to a "summarize" intent tag based on semantic similarity to summarization criteria encoded in the intent tags 206.

In some embodiments, using a prompt matching model, the query evaluation system 100 can match tags stored in the generative model functionality codex 204 to the generative query 202 by embedding both the generative query 202 and the tags stored in the generative model functionality codex 204 into a shared feature space. To elaborate, the query evaluation system 100 can represent each tag as a vector encoding its semantic features, such as expected input type, context, or operational constraints (e.g., tag parameters). The query evaluation system 100 can then compute cosine similarity between the feature representation of the generative query 202 and the feature representations of the tags stored in the generative model functionality codex 204 to measure their degree of alignment. For example, if the generative query 202 is "summarize this contract," the query evaluation system 100 may compute cosine similarity scores against tags for "summarization," "contract analysis," and "document classification," ultimately selecting the "summarization" intent tag based on determining that the "summarization" intent tag exhibits the highest similarity score.

In one or more embodiments, the query evaluation system 100 can also utilize an intent detection model (as a form of prompt matching model) to detect an intent of the generative query 202. For example, the query evaluation system 100 can utilize a generative model trained to detect the underlying intent of the generative query 202 and match it to one or more tags stored in the generative model functionality codex 204 as an intent detection model. Further, the intent detection model can analyze the generative query beyond surface-level features, interpreting context, phrasing, and implied objectives to classify the query into one or more intent categories. Once the intent detection model has detected an intent, the query evaluation system 100 can compare the detected intent with the intent metadata and tag parameters encoded in the tags to identify which tags most closely align with the query.

In some cases, the query evaluation system 100 can match and combine two or more of the intent tags 206 to the generative query 202 to improve alignment. For example, the query evaluation system 100 can combine a "find & retrieve" intent tag and a "summarize" intent tag into a "find, retrieve, and summarize" intent tag by consolidating the tag parameters of each intent tag such that the query evaluation system 100 matches to the generative query 202.

Additionally, the query evaluation system 100 can use the intent tag 222 as a base layer for generating an evaluation tag 218, upon which the query evaluation system 100 can layer additional tags 220 stored in the generative model functionality codex 204. For example, the tag parameters of the intent tag 222 can include execution instructions for the query evaluation system 100 to layer certain additional tags 220 or certain types of additional tags 220 onto the intent tag 222. Additionally, the query evaluation system 100 can match the additional tags 220 to the generative query 202 and/or the intent tag 222 by comparing the generative query 202 and/or the intent tag 222 to the additional tags 220. In some cases, based on matching one or more of the additional tags 220 to the generative query 202 or the intent tag 222, the query evaluation system 100 can layer the one or more matched additional tags 220 onto the intent tag 222.

In some cases, the query evaluation system 100 resolves conflicts between the additional tags 220 layered onto the intent tag 222 as well as conflicts between the additional tags 220 and the intent tag 222 by executing tag parameters such as dependency rules of the additional tags 220 and the intent tag 222. For example, if the intent tag 222 has a dependency rule requiring verbatim citations while an evaluation tag of the additional tags 220 has a dependency rule requiring offensive or harmful citations to be redacted, the query evaluation system 100 can redact the offensive or harmful citations before applying the citation requirement of the intent tag 222 because the dependency rule of the evaluation tag of the additional tags 220 has higher priority than the dependency rule of the intent tag 222.

In one or more implementations, the additional tags 220 layered onto the intent tag 222 comprise one or more of the behavior tags 208 stored in the generative model functionality codex 204. By layering one or more of the behavior tags 208 onto the intent tag 222, the query evaluation system 100 applies tag parameters such as domain-specific rules, policies, or constraints of the layered behavior tags 208 that guide how the intent tag 222 is executed. For example, if the generative query 202 is matched to a "summarize" intent tag 222, the query evaluation system 100 can layer an APA citation behavior tag from the behavior tags 208 to require that all summaries include APA style citations. In another example, if the intent tag 222 corresponds to a "generate email" request, the query evaluation system 100 can layer a formatting behavior tag from the behavior tags 208 that enforces organizational style conventions, such as including a subject line or signature block.

In some embodiments, the additional tags 220 comprise one or more of the dependency tags 210 stored in the generative model functionality codex 204. Specifically, by layering one or more of the dependency tags 210 onto the intent tag 222, the query evaluation system 100 enforces tag parameters of the layered dependency tags such as prerequisite conditions that must be satisfied before a generative model (e.g., the generative model 112) processes the generative query 202. For example, the query evaluation system 100 can use the one or more dependency tags 210 layered onto the intent tag 222 to ensure that user authentication confirmation, document retrieval verification, input language detection, or context length checks of the generative query 202 are completed before the generative model processes the generative query 202. Furthermore, if one or more of the dependency tags 210 determine that such a condition is unmet, the query evaluation system 100 can trigger a predetermined remedial action of one or more of the dependency tags 210 layered onto the intent tag 222 (e.g., initiating retrieval, invoking a verification tool, or halting execution with a safe failure response).

For example, if the generative query 202 requests a summary of a confidential document, the query evaluation system 100 can layer a "verification" dependency tag from the dependency tags 210 onto the intent tag 222, such that the tag parameters of the "verification" dependency tag requires a generative model to verify the authenticity of a client device before processing the generative query 202. Further, based on determining that the verification failed, the "verification" dependency tag can prevent a generative model from processing the generative query 202 and redirect the client device to an authentication service.

In one or more cases, the additional tags 220 layered onto the intent tag 222 comprise one or more of the aspect tags 212 stored in the generative model functionality codex 204. In particular, by layering one or more of the aspect tags 212 onto the intent tag 222, the query evaluation system 100 can apply tag parameters of the layered aspect tags 212 to cross-cut requirements that constrain or decorate the outputs of a generative model (e.g., generative model 112) without altering the goal of the intent tag. For instance, the tag parameters of the layered aspect tags 212 can specify that generative outputs associated with the generative query 202 must maintain a neutral tone, be age appropriate for a particular user, avoid harmful or offensive content, or adhere to a maximum length.

To elaborate, if the generative query 202 requests a news-style summary of an event, the query evaluation system 100 can layer a "neutral tone" aspect tag from the aspect tags 212 onto the intent tag 222, such that the tag parameters of the layered "neutral tone" aspect tag require a generative model to present the summary without subjective commentary or bias. Based on determining that a generative output includes opinionated language, the tag parameters of the layered "neutral tone" aspect tag can direct the generative model to regenerate the generative output until the "neutral tone" aspect tag determines that the generative output does not contain subjective commentary or bias.

In one or more cases, the additional tags 220 layered onto the intent tag 222 comprise one or more of the tool tags 214 stored in the generative model functionality codex 204. In particular, by layering one or more of the tool tags 214 onto the intent tag 222, the query evaluation system 100 can extend the capabilities of a generative model (e.g., the generative model 112). For example, one or more tag parameters of the tool tags 214 layered onto the intent tag 222 can invoke the generative model to utilize external services, deterministic functions, or specialized utilities in generating an output corresponding to the generative query 202. To elaborate, if the generative query 202 requests a calculation of dates for a tax deadline, the query evaluation system 100 can layer a "date calculator" tool tag from the tool tags 214 onto the intent tag 222. Specifically, the tag parameters of the "date calculator" tool tag can require the generative model to invoke an external utility that computes deadlines based on tax laws rather than attempting to calculate the tax deadlines heuristically. In addition, if the external utility returns an error (e.g., unsupported jurisdiction), the tag parameters of the "date calculator" tool tag can trigger a fallback instruction, such as prompting the user for additional jurisdictional details or returning a safe failure response.

In some embodiments, the additional tags 220 layered onto the intent tag 222 comprise one or more of the quality tags 216 stored in the generative model functionality codex 204. In particular, by layering one or more of the quality tags 216 onto the intent tag 222, the query evaluation system 100 can define evaluation rubrics, scoring criteria, and thresholds against which the generative output of a generative model (e.g., generative model 112) is assessed. Furthermore, the tag parameters of the one or more quality tags 216 layered onto the intent tag 222 can specify requirements such as factual accuracy, structural completeness, stylistic benchmarks, or formatting rules.

For example, if the generative query 202 requests a customer support response, the query evaluation system 100 can layer a "clarity and tone" quality tag from the quality tags 216 onto the intent tag 222. Specifically, the tag parameters of the "clarity and tone" quality tag can provide a rubric containing curated exemplars of what an exceptional support response looks like (e.g., polite, concise, and solution-oriented) along with scoring criteria that distinguish acceptable, good, great, and exceptional outputs to the generative model. Based on evaluating the generative output against this rubric, the generative model (or a separate evaluator model, such as an LLM) can determine whether the response reflects "great judgment" and meets the threshold for delivery to the client device, or whether the response should be regenerated or flagged for review.

As shown in FIG. 2, the evaluation tag 218 can include evaluation tag parameters 224. In some cases, the evaluation tag parameters 224 can include tag parameters of the intent tag 222 and the tag parameters of every one of the additional tags 220 layered onto the intent tag 222. In one or more embodiments, the query evaluation system 100 can combine the tag parameters of the intent tag 222 and every one of the additional tags 220 layered onto the intent tag 222 into a single consolidated set of evaluation tag parameters 224. Specifically, the query evaluation system 100 can consolidate the tag parameters of the intent tag 222 and every one of the additional tags 220 based on the dependency rules of the intent tag 222 and every one of the additional tags 220. Furthermore, the query evaluation system 100 can streamline the evaluation tag parameters 224 by removing redundant tag parameters.

As previously mentioned, the query evaluation system 100 can utilize a prompt matching model to generate a modified system prompt by processing evaluation tag parameters of an evaluation tag and an initial system prompt of a generative model.

Figure 3:
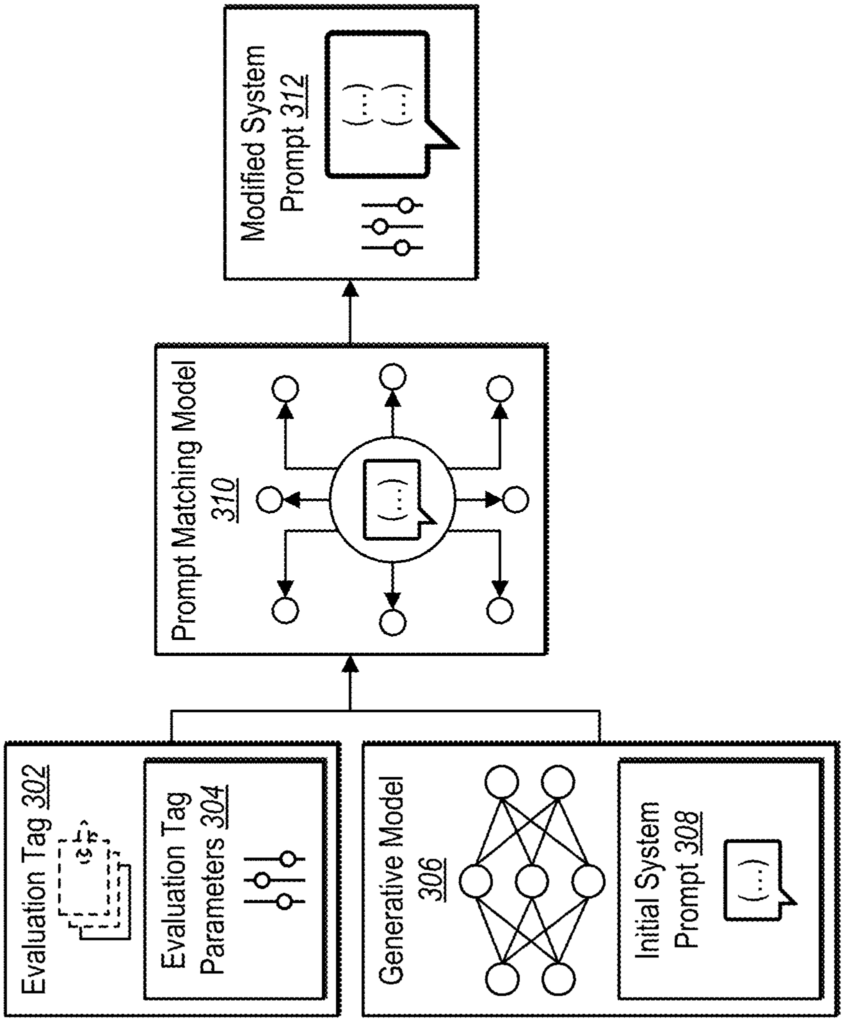
FIG. 3 illustrates the query evaluation system utilizing a prompt matching model to generate a modified system prompt based on an evaluation tag and an initial system prompt in accordance with one or more embodiments.

FIG. 3 illustrates the query evaluation system utilizing a prompt matching model to generate a modified system prompt based on an evaluation tag and an initial system prompt in accordance with one or more embodiments.

As shown in FIG. 3, the query evaluation system 100 can generate a modified system prompt 312 using a prompt matching model 310 (e.g., prompt matching model 106). Specifically, the query evaluation system 100 can provide evaluation tag parameters 304 (e.g., evaluation tag parameters 224) of an evaluation tag 302 (e.g., evaluation tag 218) to the prompt matching model 310. Further, the query evaluation system 100 can provide an initial system prompt 308 of a generative model 306 (e.g., generative model 112) to the prompt matching model 310. In some cases, the prompt matching model 310 processes these inputs by comparing the evaluation tag parameters 304 with the initial system prompt 308, determining which of the evaluation tag parameters 304 are applicable, and applying dependency rules and conflict-resolution logic embedded in the evaluation tag parameters to prioritize the evaluation tag parameters 304.

For example, if the generative query 202 requests a "find and summarize" operation, the evaluation tag parameters 304 may include execution instructions from a "summarize" intent tag, a "neutral tone" aspect tag, and a "citation accuracy" quality tag. The prompt matching model 310 can compare these parameters with the initial system prompt 308, determine that all three are applicable, and then apply dependency rules embedded in the evaluation tag parameters 304 to determine priority. Specifically, the prompt matching model 310 may determine that the dependency rules embedded in the evaluation tag parameters 304 require the "citation accuracy" quality tag to be applied after the "summarize" intent tag, and the "neutral tone" aspect tag to override stylistic elements that conflict with a quality rubric of the "summarize" intent tag.

Based on the prioritized evaluation tag parameters, the prompt matching model 310 can generate the modified system prompt 312 by embedding the prioritized evaluation tag parameters from the evaluation tag parameters 304 into the initial system prompt 308. In some embodiments, the prompt matching model 310 embeds the prioritized evaluation tag parameters into the initial system prompt 308 by concatenating auxiliary prompts, inserting execution instructions according to a prescribed order of operations, incorporating tool call schemas, and inserting evaluation rubrics or logging directives embedded in the prioritized evaluation tag parameters into the initial system prompt 308.

Figure 4A:
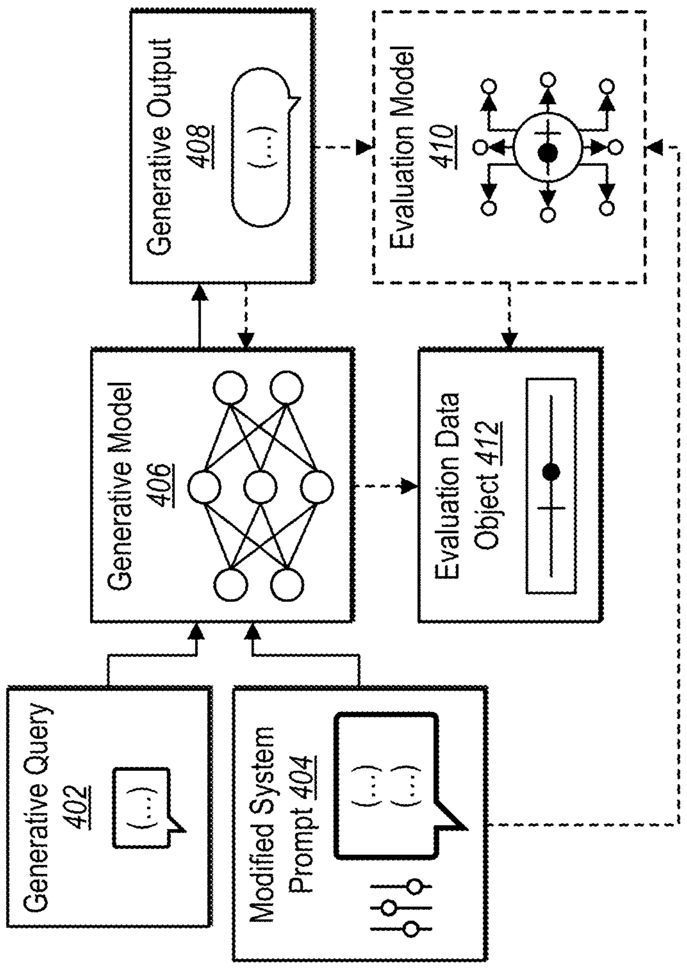
FIG. 4A illustrates an overview of the query evaluation system using a generative model to generate a generative output and using either the generative model or an evaluation model to generate an evaluation data object corresponding to the generative output in accordance with one or more embodiments.
Figure 4B:
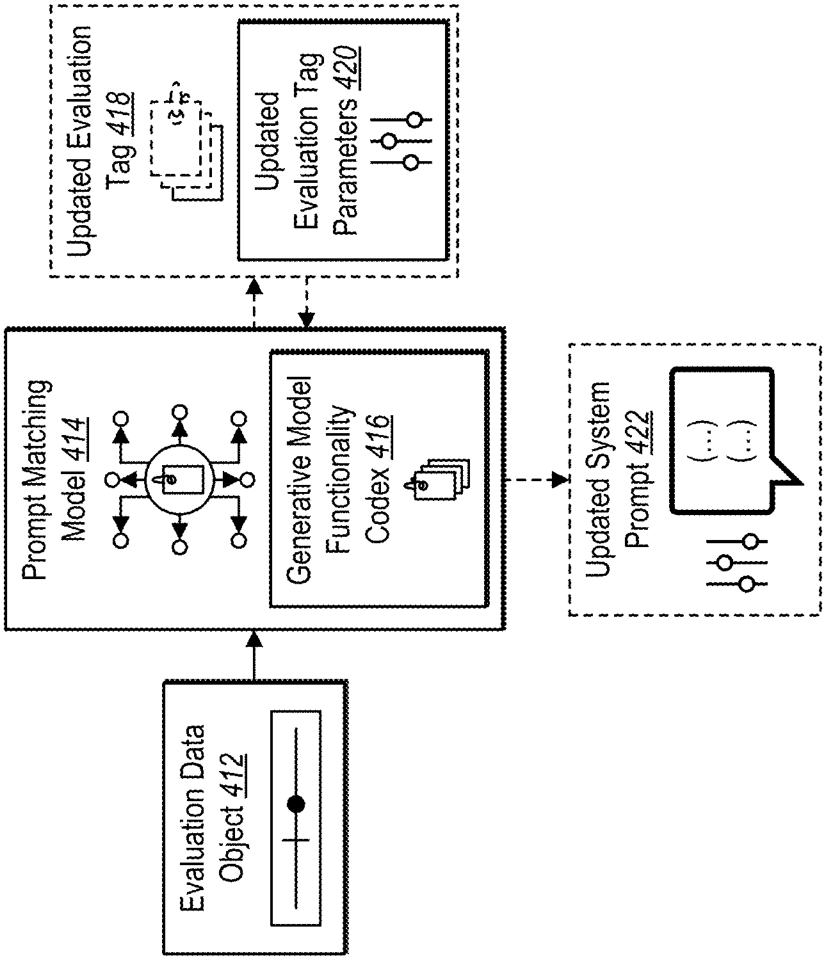
FIG. 4B illustrates an example of the query evaluation system updating an evaluation tag by using a prompt matching model to process an evaluation data object in accordance with one or more embodiments.

In some embodiments, the query evaluation system 100 can utilize a generative model to generate a generative output and an evaluation data object corresponding to the generative output. FIGS. 4A-4B illustrate the query evaluation system 100 using a generative model to generate a generative output, using either the generative model or an evaluation model to generate an evaluation data object corresponding to the generative output, and updating an evaluation tag by using a prompt matching model to process the evaluation data object in accordance with one or more embodiments.

As shown in FIG. 4A, the query evaluation system 100 can provide a generative query 402 (e.g., generative query 102, generative query 202) and a modified system prompt 404 (e.g., modified system prompt 312) associated with the generative query 402 to a generative model 406 (e.g., generative model 112, generative model 306). In one or more embodiments, the generative model 406 can process the generative query 402 and the modified system prompt 404 to generate a generative output 408 (e.g., generative output 114).

In some embodiments, the generative model 406 generates the generative output 408 by executing auxiliary prompts, execution instructions, and dependency rules embedded in the modified system prompt 404 in combination with the content of the generative query 402. Specifically, the generative model 406 can utilize evaluation tag parameters embedded in the modified system prompt 404 to process and apply one or more of task-specific instructions originating from an intent tag, domain-specific rules or policies originating from one or more behavior tags, prerequisite conditions originating from one or more dependency tags, and stylistic or safety constraints originating from one or more aspect tags. In addition, the generative model 406 can utilize the evaluation tag parameters embedded in the modified system prompt 404 to invoke external functions or services according to one or more tool tags and structure the generative output 408 according to evaluation rubrics originating from one or more quality tags.

For example, if the generative query 402 requests, "summarize the key points of this financial report," the modified system prompt 404 may utilize evaluation tag parameters from a "summarize" intent tag, a "compliance formatting" behavior tag, a "neutral tone" aspect tag, a "table generator" tool tag, an "accuracy and clarity" quality tag, and a "verification" dependency tag embedded in the modified system prompt 312. When processing this input, the generative model 406 can first follow the embedded evaluation tag parameters of the modified system prompt 404 by verifying that the financial report has been authenticated before execution proceeds. Once the prerequisite is satisfied, the generative model 406 can generate the generative output 408 by summarizing the report content, ensuring the generative output 408 conforms to compliance formatting rules, maintaining a neutral tone, invoking a table generator tool to present financial figures, and organizing the generative output 408 to align with a clarity rubric according to the evaluation tag parameters embedded in the modified system prompt 404.

In some cases, the query evaluation system 100 can return the generative output 408 to the generative model 406. Upon receiving the generative output 408, the generative model 406 can utilize the modified system prompt 404 and the generative output 408 to generate an evaluation data object 412. In one or more embodiments, the query evaluation system 100 generates the evaluation data object 412 by using the generative model 406 to generate an alignment score between the generative output 408 and expected outputs and/or rubrics defined in the evaluation tag parameters embedded in the modified system prompt 404. To elaborate, the generative model 406 can apply an evaluation rubric embedded in the modified system prompt 404 to the generative output 408 by comparing semantic similarity between the generative output 408 and exemplar responses, verifying structural or formatting conformance, and performing factual consistency checks. In addition, the generative model 406 can normalize these results into a single alignment score.

In some implementations, the generative model 406 can compare the alignment score to an alignment threshold embedded in the modified system prompt 404 and generate an indication of whether the alignment score satisfies the alignment threshold to include in the evaluation data object 412. In some cases, the generative model 406 generates an explanation of why the generative output 408 either satisfied or failed to satisfy the alignment threshold to include in the evaluation data object 412.

In some embodiments, the query evaluation system 100 can use an evaluation model 410 instead of, or in parallel with, the generative model 406 to generate the evaluation data object 412. In particular, the evaluation model 410 can receive the generative output 408 and the modified system prompt 404 and compute an alignment score between the generative output 408 and an expected output defined by evaluation tag parameters embedded in the modified system prompt 404. Further, the evaluation model 410 can then generate the evaluation data object 412 including the alignment score and an indication of whether the alignment score satisfies an alignment threshold.

As mentioned above, the query evaluation system 100 can operate the evaluation model 410 in parallel with the generative model 406 to provide a secondary or corroborating measure of success. For example, the generative model 406 may produce both the generative output 408 and an evaluation data object 412, while the evaluation model 410 independently computes a separate alignment score for the same generative output 408. The query evaluation system 100 can then reconcile or cross-validate the two measures of success, identify discrepancies, or use the evaluation model 410 as an authoritative source for final scoring.

As previously mentioned, the query evaluation system 100 can update an evaluation tag based on an evaluation data object. FIG. 4B illustrates an example of the query evaluation system updating an evaluation tag by using a prompt matching model to process an evaluation data object in accordance with one or more embodiments.

As shown in FIG. 4B, the query evaluation system 100 can provide an evaluation data object 412 to a prompt matching model 414 (e.g., prompt matching model 106, 310). Further, the prompt matching model 414 can analyze an alignment score and associated pass/failure indicators encoded in the evaluation data object 412. For example, the prompt matching model 414 can determine whether the alignment score satisfies an alignment threshold also encoded in the evaluation data object 412. For example, if the prompt matching model 414 determines that the alignment score satisfies the alignment threshold, the query evaluation system 100 can provide the generative output 408 for display on a client device.

In one or more implementations, the prompt matching model 414 can generate an updated evaluation tag 418 based on determining that the alignment score does not satisfy the alignment threshold. Specifically, the prompt matching model 414 can generate updated evaluation tag parameters 420 by updating one or more evaluation tag parameters of an evaluation tag associated with the evaluation data object 412 (e.g., evaluation tag 218, 302). To elaborate, the prompt matching model 414 can analyze the evaluation data object 412 to determine which rubric metrics, dependency checks, or execution steps used by the prompt matching model 414 caused the evaluation data object 412 to fall below the alignment threshold.

In addition, the prompt matching model 414 can then update the evaluation tag parameters of the associated evaluation tag by adjusting rubric thresholds, reordering or refining dependency rules, modifying execution instructions, or incorporating new auxiliary prompts or tool calls to address the deficiencies identified in the evaluation data object 412. In particular, the prompt matching model 414 can generate the updated evaluation tag 418 by removing evaluation tag parameters from the associated evaluation tag or matching additional evaluation tags from the Generative model functionality codex 416 (e.g., Generative model functionality codex 108, 204) to the associated evaluation tag and embedding one or more evaluation tag parameters from the additional matching evaluation tags into the associated evaluation tag.

For example, upon determining from the evaluation data object 412 that a generative output (e.g., generative output 408) failed a "neutrality" rubric, the prompt matching model 414 can update an evaluation tag associated with the generative output (e.g., evaluation tag 218, 302) by removing conflicting tag parameters (e.g., a "persuasive tone" tag parameter originating from an aspect tag 212) from the associated evaluation tag. In some cases, the prompt matching model 414 matches additional tags from the Generative model functionality codex 416 (e.g., a "neutral tone" aspect tag 212) to the associated evaluation tag and embeds tag parameters from the matched additional evaluation tags into the associated evaluation tag.

In one or more embodiments, the prompt matching model 414 can generate an updated system prompt 422 by updating the modified system prompt 404. In particular, the prompt matching model 414 can compare the updated evaluation tag parameters 420 to the evaluation tag parameters embedded into the modified system prompt 404. Based on this comparison (e.g., a parameter differential), the prompt matching model 414 can revise and/or remove evaluation tag parameters of the modified system prompt 404 and embed one or more of the updated evaluation tag parameters 420 into the modified system prompt 404. In some cases, the prompt matching model 414 can generate the updated system prompt 422 by using the dependency rules encoded in the updated evaluation tag parameters 420 (e.g., intent parameters first, followed by dependency, behavior, aspect, tool, and quality parameters). For example, if the evaluation data object 412 indicates that the generative output 408 failed a factual accuracy check, the prompt matching model 414 can embed a "fact verification" tool evaluation tag parameter from the updated evaluation tag parameters 420 into the modified system prompt 404.

Figure 5:
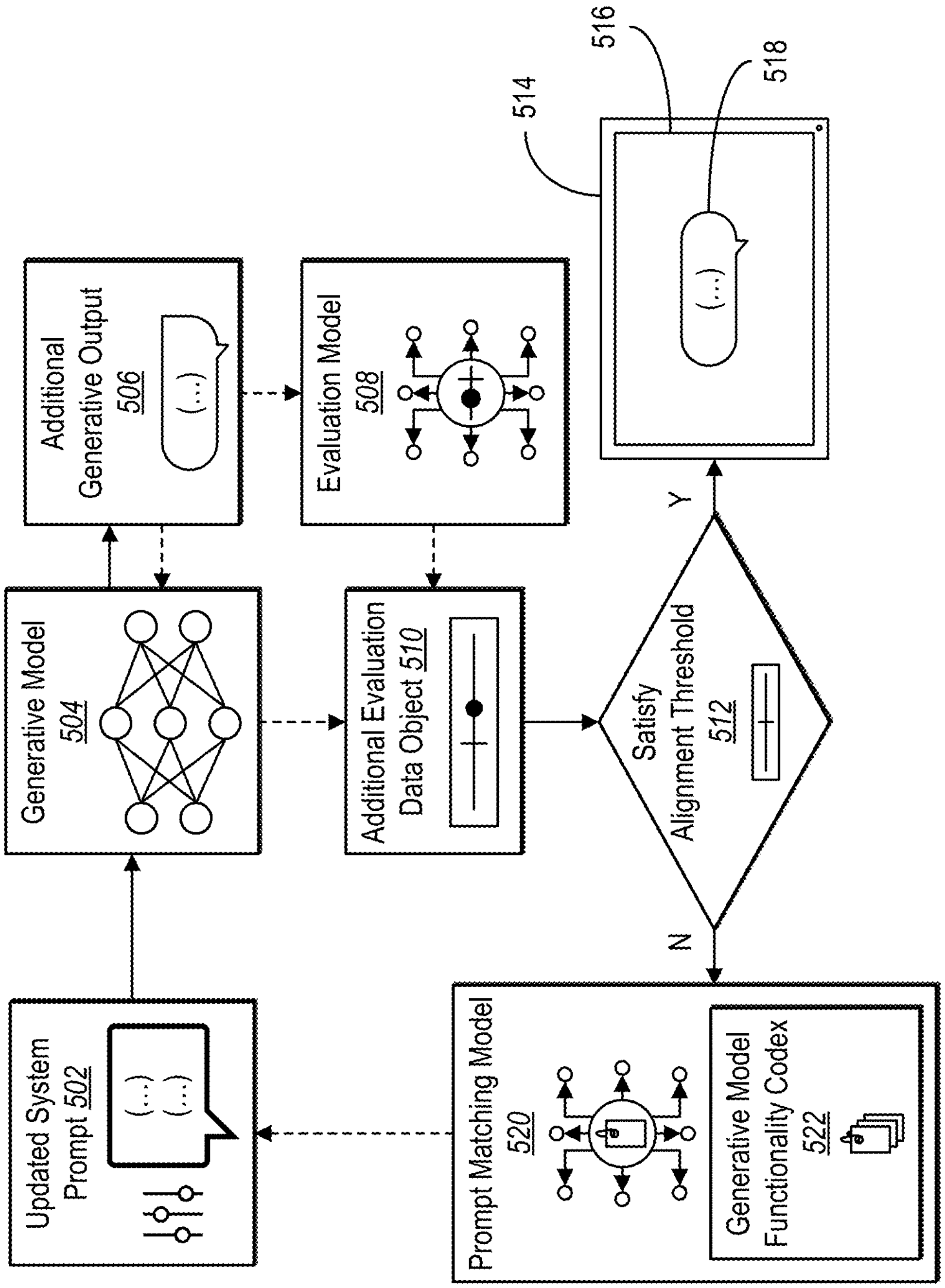
FIG. 5 illustrates the query evaluation system using a generative model to generate an additional generative output for display on a client device and an additional evaluation data object corresponding to the additional generative output in accordance with one or more embodiments.

In some embodiments, the query evaluation system 100 can provide the updated system prompt 422 to a generative model to generate an additional generative output. FIG. 5 illustrates the query evaluation system using a generative model to generate an additional generative output and an additional evaluation data object corresponding to the additional generative output in accordance with one or more embodiments.

As shown in FIG. 5, the query evaluation system 100 can provide an updated system prompt 502 (e.g., updated system prompt 422) to a generative model 504 (e.g., generative model 112, 306, 406). Upon receiving the updated system prompt 502, the generative model 504 can utilize the updated system prompt 502 to generate an additional generative output 506. In particular, the generative model 504 can generate the additional generative output 506 by creating a response to a generative query (e.g., generative query 102, 202, 402) associated with the updated system prompt 502 and subject to the updated evaluation tag parameters embedded in the updated system prompt 502. For example, the generative model 504 can apply revised dependency rules, updated rubric thresholds, or newly incorporated tool invocations included in the updated evaluation tag parameters embedded in the updated system prompt 502.

In one or more embodiments, the query evaluation system 100 can utilize the generative model 504 to generate an additional evaluation data object 510 based on the additional generative output 506. In particular, the additional evaluation data object 510 can include an alignment score measuring how closely the additional generative output 506 conforms to the expected output(s) (e.g., originating from a quality tag stored in the generative model functionality codex 522) embedded in the updated system prompt 502, as well as an indication of whether the alignment score satisfies an alignment threshold embedded in the updated system prompt 502. In some cases, the additional evaluation data object 510 can further include component scores per rubric metric, dependency validation results, and explanations describing why the additional generative output 506 did or did not satisfy specific evaluation tag parameters embedded in the updated system prompt 502.

In some implementations, the query evaluation system 100 can utilize an evaluation model 508 (e.g., evaluation model 410) to process the additional generative output 506 and generate the additional evaluation data object 510. In particular, the evaluation model 508 can compare the additional generative output 506 against evaluation tag parameters embedded in the updated system prompt 502, compute an alignment score, and determine whether the score satisfies an alignment threshold embedded in the updated system prompt 502.

In some cases, the query evaluation system 100 can operate the evaluation model 508 in parallel with the generative model 504 to provide a secondary or corroborating measure of success. For example, the generative model 504 may produce both the additional generative output 506 and an independent additional evaluation data object 510, while the evaluation model 508 independently computes a separate alignment score for the same additional generative output 506. The query evaluation system 100 can then reconcile or cross-validate the two measures of success, identify discrepancies, or use the evaluation model 508 as an authoritative source for final scoring.

Furthermore, the additional evaluation data object 510 satisfies an alignment threshold, and transmitting the additional generative output 506 to the client application 516 for presentation to the user (e.g., displaying the additional generative output 506 in a user interface 518). In some cases, the act 512 comprises the query evaluation system 100 determining that the additional evaluation data object 510 does not satisfy an alignment threshold, and providing the additional evaluation data object 510 to a prompt matching model 520 (e.g., prompt matching model 106, 310, 414).

In such cases, the prompt matching model 520 can analyze the additional evaluation data object 510 to identify deficiencies in rubric metrics, dependency checks, or execution steps associated with the updated system prompt 502. Based on this analysis, the prompt matching model 520 can generate a further updated evaluation tag and corresponding updated system prompt that address the deficiencies, which may then be used by the generative model 504 to generate a further additional generative output. Thus, the query evaluation system 100 can iteratively generate additional generative outputs and additional evaluation data objects corresponding to the additional generative outputs until an alignment score of an additional evaluation data object satisfies the alignment threshold. In some cases, the query evaluation system 100 may cease iterating after a predetermined number of iterations have been completed. In some cases, the predetermined number of iterations is embedded in the modified system prompt 502.

Figure 6:
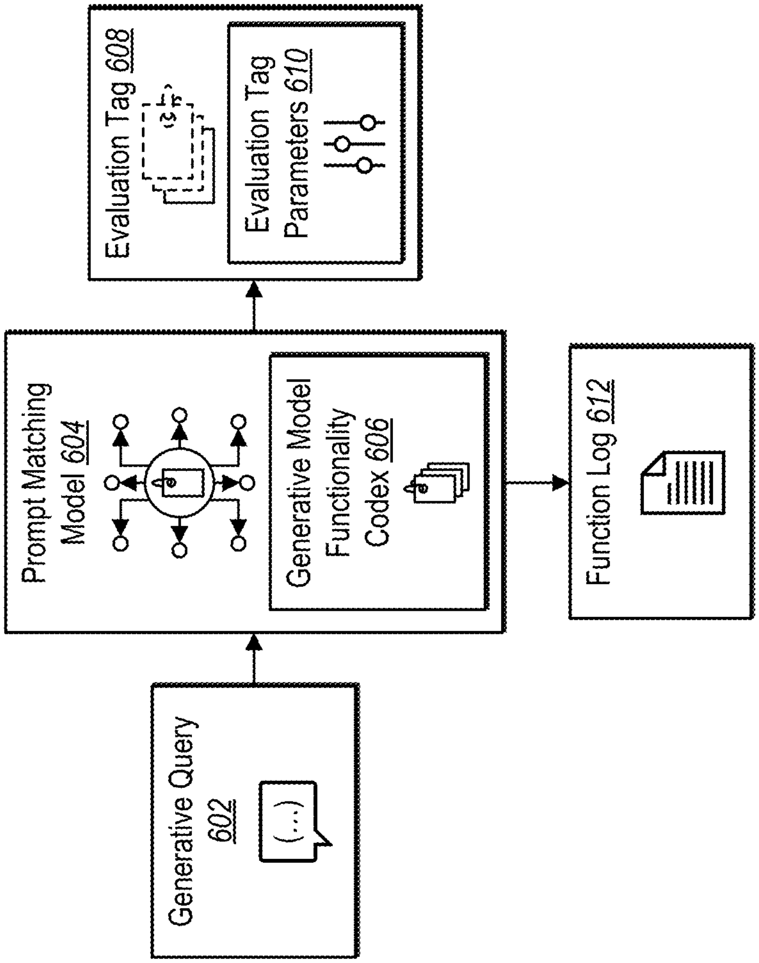
FIG. 6 illustrates an overview of the query evaluation system generating an evaluation tag and a corresponding function log in accordance with one or more embodiments.

As previously mentioned, the query evaluation system 100 can record comparisons between a generative query and one or more evaluation tags in a generative model functionality codex in a function log. FIG. 6 illustrates an overview of the query evaluation system generating an evaluation tag and a corresponding function log in accordance with one or more embodiments.

As shown in FIG. 6, the query evaluation system 100 can provide a generative query 602 to a prompt matching model 604 (e.g., prompt matching model 106, 310, 414, 520). In some cases, the prompt matching model 604 can generate an evaluation tag 608 (e.g., evaluation tag 218, 302) based on comparing the generative query 602 to one or more evaluation tags stored in the generative model functionality codex 606 (e.g., generative model functionality codex 108, 204, 416, 522).

Specifically, the query evaluation system 100 can match one or more evaluation tags stored in the generative model functionality codex 606 to the generative query 202. For instance, the query evaluation system 100 can match one or more evaluation tags stored in the generative model functionality codex 204 by determining which of the evaluation tags align most closely with the applicability conditions or semantic features of the generative query 202. Additionally, the query evaluation system 100 can use an intent tag stored in the generative model functionality codex 606 as a base layer for generating the evaluation tag 608, upon which the query evaluation system 100 can layer additional evaluation tags stored in the generative model functionality codex 606. Furthermore, the query evaluation system 100 can resolve conflicts between the additional evaluation tags layered onto the intent tag as well as conflicts between the additional evaluation tags and the intent tag.

As shown in FIG. 6, the query evaluation system 100 generates a function log 612 detailing how the query evaluation system 100 matched one or more tags of the generative model functionality codex 606 to the generative query 602. To elaborate, the query evaluation system 100 can log one or more tags from the generative model functionality codex 606 that the query evaluation system 100 identified as candidate tags for matching to the generative query 602. In particular, the query evaluation system 100 can record, in the function log 612, all candidate tags retrieved from the generative model functionality codex 606 prior to selection. In addition, for each candidate tag, the query evaluation system 100 stores a tag identifier, feature-space similarity score(s) and/or classifier probabilities, any rule-based matches (e.g., keyword, schema, or dependency-rule hits), disqualification reasons (e.g., unmet preconditions, confidence below threshold, mutual exclusivity), and a ranked order of candidate tags. Further, the query evaluation system 100 can also log scoring configurations (e.g., weights, thresholds, tie-break policy) of the candidate tags. In some cases, the query evaluation system 100 can record a natural language description for why each candidate tag was considered and how the query evaluation system 100 determined whether to match each candidate tag.

In addition to the data regarding each candidate tag, the query evaluation system 100 can log additional data regarding one or more candidate tags from the generative model functionality codex 606 that the query evaluation system 100 matched to the generative query. Specifically, for each matched tag, the query evaluation system 100 can record, a tag identifier, evaluation tag parameters (e.g., dependency-rule outcomes, execution instructions), and a matching confidence score (with the configured thresholds and tie-break policy). In addition, the query evaluation system 100 can record a ranking of the matched tags based on their recorded confidence scores. Furthermore, the query evaluation system 100 can record a natural language explanation of why each of the matched tags was selected.

In some embodiments, the query evaluation system 100 records how the query evaluation system 100 layered the matching tags to form the evaluation tag 608 in the function log 612. For example, the query evaluation system 100 can record an identifier of a base intent tag of the evaluation tag 608, an order of additional tags layered onto the base intent tag, and an explanation of the decisions the query evaluation system 100 made while selecting base intent tag and layering the additional tags thereon. In addition, the query evaluation system 100 can record conflict-resolution decisions and evaluation tag parameter consolidation decisions (e.g., which parameters from an upstream tag were bound or overridden downstream).

In some implementations, the query evaluation system 100 records, in the function log 612, evaluation tag parameters 610 (e.g., evaluation tag parameters 304) embedded in a modified system prompt (e.g., modified system prompt 312, 404). For each modification that the query evaluation system 100 makes to the modified system prompt, the function log 612 can capture the effective set of parameters (e.g., rubric thresholds, dependency rules, execution instructions, tool-invocation plans) that were embedded in the modified system prompt along with references to the tags from which the parameters originated.

Furthermore, the query evaluation system 100 can record changes to the parameters of a modified system prompt across iterative updates in the function log 612. For example, if an evaluation data object indicates that an alignment score of a generative output falls below a threshold, the query evaluation system 100 can generate an updated modified system prompt by updating the modified system prompt by removing or altering evaluation tag parameters embedded in the modified system prompt or embedding additional evaluation tag parameters from the generative model functionality codex into the modified system prompt. For example, the query evaluation system 100 can record each such revision into the function log 612 (e.g., threshold increased from 0.75 to 0.80, new tool plan enabled, rubric weight rebalanced), the rationale for the adjustment, and the iteration index.

In addition, the query evaluation system 100 can log execution context metadata into the function log 612. For example, the query evaluation system 100 can store timestamps for when each modification occurred, query or session identifiers to link updates to specific user interactions, and model or classifier version identifiers to capture which components were active at the time of execution. The query evaluation system 100 can also record runtime settings, such as active thresholds, tool invocation configurations, or dependency-rule policies, that the query evaluation system 100 used to generate an evaluation tag.

Figure 7:
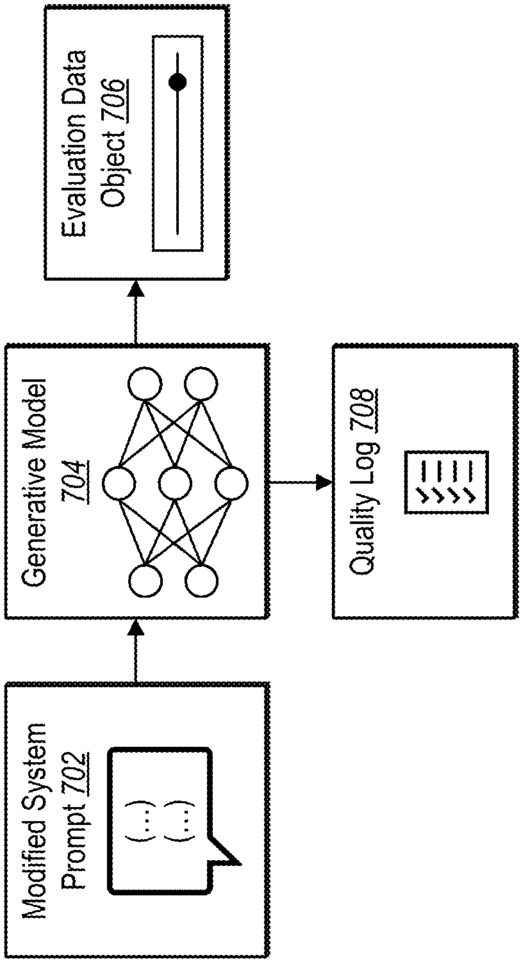
FIG. 7 illustrates the query evaluation system using a generative model to generate an evaluation data object and a corresponding quality log in accordance with one or more embodiments.

In one or more implementations, the query evaluation system 100 generates a quality log detailing performance metrics of a generative model. FIG. 7 illustrates the query evaluation system using a generative model to generate an evaluation data object and a corresponding quality log in accordance with one or more embodiments.

As shown in FIG. 7, the query evaluation system 100 can provide a modified system prompt 702 (e.g., modified system prompt 312, 404) to a generative model 704 (e.g., generative model 112, 306, 406, 504). Further, the generative model 704 can process the modified system prompt 702 to generate an evaluation data object 706 (e.g., evaluation data object 118, 412). In particular, the query evaluation system 100 can generate the evaluation data object 706 by using the generative model 704 to generate an alignment score between a generative output (e.g., generative output 114, 408) and expected outputs and/or rubrics defined in one or more evaluation tag parameters embedded in the modified system prompt 702.

As the query evaluation system 100 uses the generative model 704 to generate the evaluation data object 706, the query evaluation system 100 can record one or more performance metrics of the generative model 704 in generating the evaluation data object 706 in a quality log 708. For example, when the generative model 704 computes a score such as an alignment score or a confidence score, the generative model 704 can write a scalar score and rubric sub-scores into a normalized schema and set Boolean pass/fail flags for each threshold embedded in the modified system prompt 702. Further, if the generative model 704 returns a rationale, the query evaluation system 100 stores either the text or a hashed reference, depending on privacy policy. In addition, the generative model 704 can record confidence values alongside a scoring method identifier (e.g., cosine similarity, calibrated classifier). In some cases, the generative model 704 can tag each entry with a timestamp and a session/query identifier.

In one or more embodiments, the generative model 704 can capture performance metrics of the generative model 704 using lightweight counters and timers. For example, The generative model 704 can start a timer when the modified system prompt 702 is submitted and stop the timer on receipt of the final. Further, the generative model 704 can log intermediate timestamps (e.g., queue entry, first token, last token). In addition, the generative model 704 tally token counts incrementally during streaming (e.g., prompt, completion, and total) and estimate compute usage from token totals and model pricing/throughput catalogs. Moreover, for tool-enabled executions, the generative model 704 can log per-tool outcomes (success/partial/failure) and compute usage. In some cases, the generative model 704 can log faults using an error interceptor that records error class, message, and recovery action (retry, fallback model, degraded mode). Similarly, the query evaluation system 100 can utilize the generative model 704 to generate a quality log 708 to record one or more performance metrics of the generative model 704 in generating a generative output.

Additionally, the query evaluation system 100 can utilize other generative models within the evaluator architecture to generate quality logs. For example, an evaluator model can use the same methods as the generative model 704 recording performance metrics in generating an evaluation data object as an evaluator model in generating an evaluation data object, an intent-detection model in determining an intent of a generative query, and an execution instruction updater in updating execution instructions.

Figure 8:
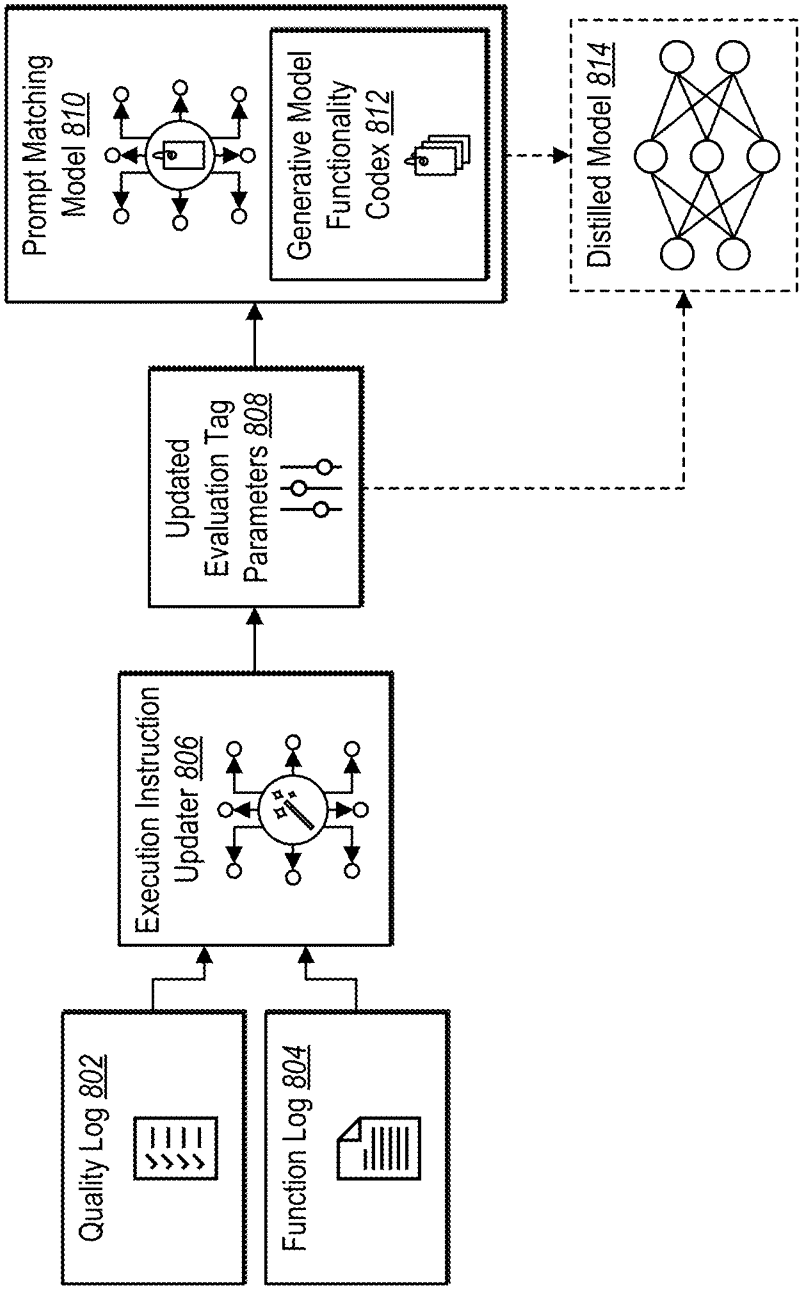
FIG. 8 illustrates an overview of the query evaluation system updating one or more tags in generative model functionality codex using a quality log and a function log to generate updated evaluation tag parameters to provide to a prompt matching model and a distilled model in accordance with one or more embodiments.

As previously mentioned, the query evaluation system 100 can utilize a quality log and a function log to update one or more tags within a generative model functionality codex. FIG. 8 illustrates an overview of the query evaluation system 100 updating one or more tags in a generative model functionality codex using a quality log and a function log to generate updated evaluation tag parameters to provide to a prompt matching model in accordance with one or more embodiments.

As shown in FIG. 8, the query evaluation system 100 can provide a quality log 802 and a function log 804 to an execution instruction updater 806. Furthermore, the query evaluation system 100 can utilize the execution instruction updater 806 to generate updated evaluation tag parameters 808. For example, the execution instruction updater 806 can analyze the quality log 802 to determine whether certain evaluation tag parameters are consistently guiding generative models to generate accurate generative outputs or whether the evaluation tag parameters should be adjusted. Specifically, the execution instruction updater 806 can examine normalized scalar scores, rubric sub-scores, and Boolean pass/fail flags recorded in the quality log 802 to determine whether generative outputs of a generative model are reliably meeting rubric thresholds, frequently failing to satisfy success conditions, or exhibiting inconsistent alignment across different queries and sessions. Furthermore, the execution instruction updater 806 can analyze rationales (stored as text or hashed references), confidence values with associated scoring method identifiers (e.g., cosine similarity, calibrated classifier), and metadata such as timestamps or session identifiers to determine whether observed performance trends are tied to specific sessions, query types, or temporal factors.

In one or more embodiments, the query evaluation system 100 can utilize the execution instruction updater 806 to analyze the function log 804. For example, the execution instruction updater 806 can analyze the function log 804 to determine how candidate tags were retrieved and evaluated against a generative query by reviewing tag identifiers, similarity scores, classifier probabilities, rule-based matches, and reasons for disqualification. The execution instruction updater 806 can further examine the ranked order of candidate tags and the scoring configurations (e.g., weights, thresholds, tie-break policies) that influenced the final tag selection. Thus, the execution instruction updater 806 can determine why the query evaluation system 100 is succeeding or failing to generate modified system prompts that guide generative models to efficiently guide generative models to generate sufficiently accurate generative outputs.

The execution instruction updater 806 can also analyze function log entries describing matched tags, including their evaluation tag parameters (e.g., dependency-rule outcomes, execution instructions), confidence scores, and natural language explanations for why particular tags were selected. In some cases, the execution instruction updater 806 can analyze the selected tags to determine whether the selected tags consistently led to generative outputs that satisfied rubric thresholds or not and update the tag parameters of the selected tags accordingly.

For example, based on analyzing the function log 804, the execution instruction updater 806 can determine that the function log 804 indicates that a high-confidence candidate tag was repeatedly disqualified because the high-confidence candidate tag contains a dependency rule that requires a specific keyword that was often phrased differently in user queries. As a result, the execution instruction updater 806 can determine that the query evaluation system 100 defaulted to selecting a lower-ranked candidate tag, which produced generative outputs that did not satisfy an alignment threshold. Further, the execution instruction updater can analyze the function log 804 to determine how the dependency rule of the high-confidence candidate tag lowered the efficiency of the query evaluation system 100. Thus, the execution instruction updater can update the dependency rule of the high-confidence candidate tag to increase the efficiency and accuracy of the query evaluation system 100.

Additionally, the execution instruction updater 806 can analyze the function log 804 to determine how the query evaluation system 100 layered tags from the generative model functionality codex 812 to generate one or more evaluation tags. For instance, the execution instruction updater 806 can capture the identifier of a base intent tag, the order in which additional tags were layered, and conflict-resolution or parameter consolidation decisions to determine whether the layering strategies or conflict-resolution rules used by the query evaluation system 100 contributed to alignment failures or inefficiencies. Thus, the execution instruction updater 806 can modify the execution instructions of the base intent tag and the additional tags layered onto the base intent tag to improve the layering strategies and conflict-resolution rules of the query evaluation system 100.

In one or more implementations, the execution instruction updater 806 can analyze how the query evaluation system 100 updated parameters of a modified system prompt across iterative revisions. For example, the execution instruction updater can analyze the function log 804 to identify which evaluation tag parameters of the modified system prompt were kept, altered, removed, or added to the modified system prompt by the query evaluation system 100. Thus, the query evaluation system 100 can determine which evaluation tag parameters led to unacceptable generative outputs, and which evaluation tag parameters led to acceptable generative outputs and modify the execution instructions embedded in the modified system prompt accordingly.

As shown in FIG. 8, the query evaluation system 100 can provide the updated evaluation tag parameters 808 generated by the execution instruction updater to the prompt matching model 810. Upon receiving the updated evaluation tag parameters, the prompt matching model 810 can update one or more tags stored in the generative model functionality codex 812. To elaborate, the prompt matching model 810 can match the updated evaluation tag parameters 808 to tags within the generative model functionality codex 812 that should be updated by comparing the structure and identifiers of the updated evaluation tag parameters 808 against existing tag entries in the generative model functionality codex 812. Indeed, the prompt matching model 810 can use tag identifiers, feature-space similarity scores, and classifier probabilities recorded in the function log to determine which tag or set of tags within the generative model functionality codex 812 the updated parameters originated from. In some cases, the model can analyze dependency-rule outcomes, rubric categories, or execution instruction signatures to ensure that the updated parameters are applied to the correct tag.

In one or more embodiments, the prompt matching model 810 can update one or tags stored in the generative model functionality codex 812 based on matching the one or more tags to the updated evaluation tag parameters 808. In particular, the prompt matching model 810 can integrate revised parameters such as updated rubric thresholds, dependency rules, or execution instructions of the updated evaluation tag parameters 808 into the tag parameters of the one or more matched tags. Further, the prompt matching model 810 can apply these revisions by adjusting or replacing outdated or redundant values within the tag parameters of the one or more matched tags while preserving portions of the tag parameters that remain valid.

For example, if the prompt matching model 810 determines that the updated evaluation tag parameters 808 indicate that a rubric threshold for accuracy should be raised from 0.75 to 0.80, the prompt matching model 810 can identify the corresponding tag in the generative model functionality codex 812 and update only the threshold value while leaving other parameters, such as dependency rules or execution instructions, unchanged. Similarly, if the prompt matching model 810 determines, based on analyzing the updated evaluation tag parameters 808, that an execution instruction within a tag stored in the generative model functionality codex 812 is inefficient, the prompt matching model 810 can replace that instruction with a revised parameter from the updated evaluation tag parameters while preserving valid instructions.

In some embodiments, the query evaluation system 100 can distill either one or both of the updated evaluation tag parameters 808 and one or more updated tags in the generative model functionality codex 812 into a smaller student model (e.g., distilled model 814). In particular, the system can compile a distillation corpus and training recipe from the codex comprising one or more of execution instructions such as behavior/dependency/aspect/tool requirements rendered into canonical prompts and tool-calling traces, quality-tag rubrics and thresholds converted into target outputs and scoring signals, or failure cases and remedial actions from the quality log 802 or the function log 804. Subsequently, the query evaluation system 100 can use the compiled distillation corpus and training recipe to label pairs (input, expected output, scores/justifications) which the query evaluation system 100 uses to train the student model to reproduce teacher outputs via supervised fine-tuning, policy distillation, and/or preference optimization.

In addition to the foregoing, implementations can also be described in terms of flowcharts comprising acts or steps in a method for accomplishing a particular result. For example, FIG. 9 illustrates an example series of acts for generating a content stack link in accordance with one or more embodiments.

Figure 9:
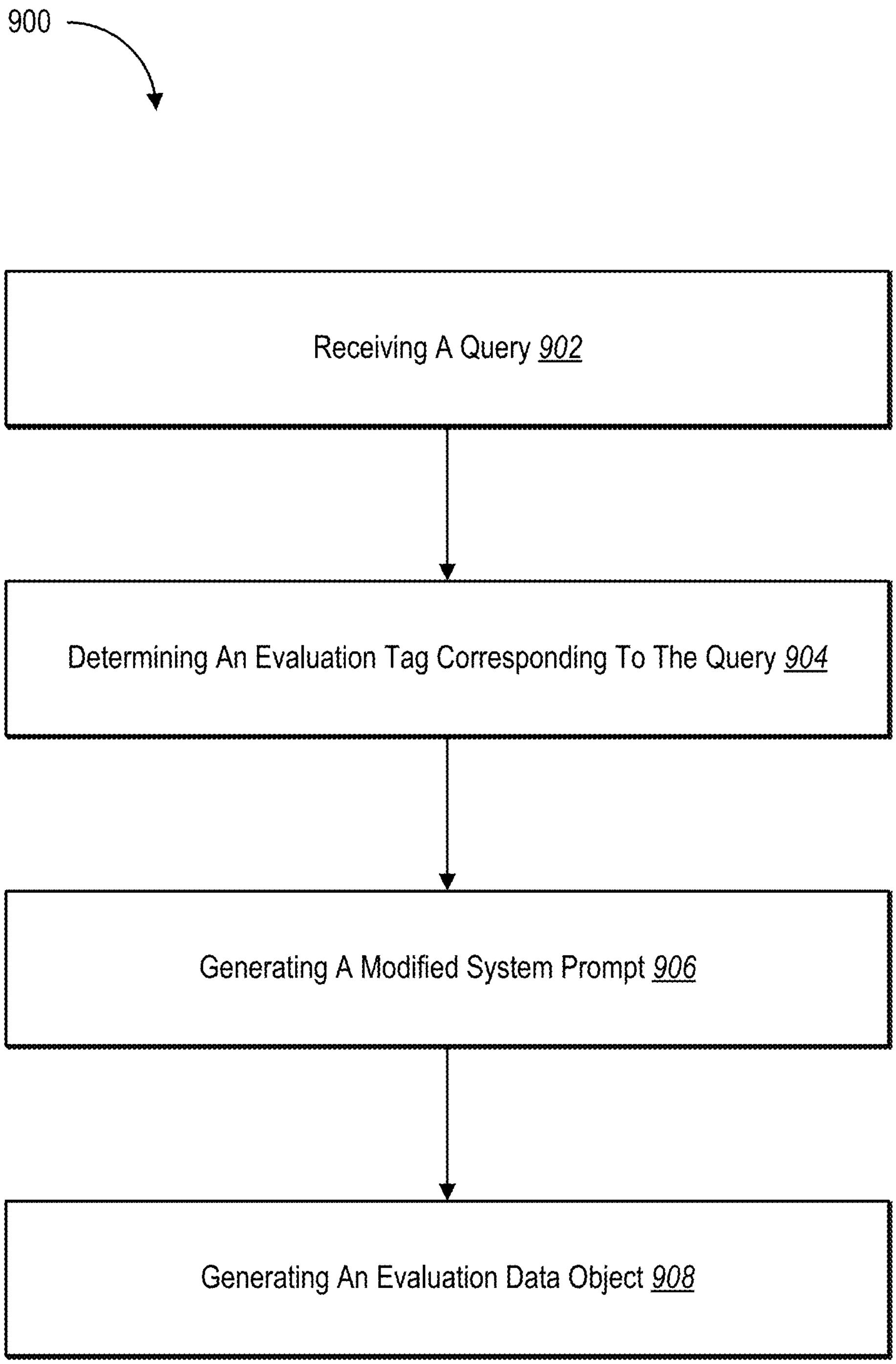
FIG. 9 illustrates an example series of acts for generating an evaluation data object in accordance with one or more embodiments.

While FIG. 9 illustrates acts according to certain implementations, alternative implementations may omit, add to, reorder and/or modify any of the acts shown in FIG. 9. The acts of FIG. 9 can be performed as part of a computer-implemented method. Alternatively, a non-transitory computer readable medium can comprise instructions, that when executed by one or more processors, cause a computing device to perform the acts of FIG. 9. In still further implementations, a system can perform the acts of FIG. 9.

As shown in FIG. 9, the series of acts 900 can include an act 902 of receiving a query. Additionally, the series of acts 900 can include an act 904 of determining an evaluation tag corresponding to the query. Further, the series of acts 900 can include an act 906 of generating a modified system prompt. In addition, the series of acts 900 can include an act 908 of generating an evaluation data object.

For example, the series of acts 900 can include acts to perform any of the operations described in the following clauses:

CLAUSE 1. A computer-implemented method comprising:

- receiving a query from a client device interacting with a generative model;
- determining an evaluation tag corresponding to the query by comparing the query with parameters of evaluation tags stored in a generative model functionality codex;
- generating a modified system prompt for the generative model by combining an initial system prompt of the generative model with parameters of the evaluation tag corresponding to the query; and
- generating, using the generative model to process the query and the modified system prompt, an evaluation data object indicating a measure of success by the generative model in responding to the query according to the evaluation tag.

CLAUSE 2. The computer-implemented method of clause 1, wherein the parameters of the evaluation tags stored in the generative model functionality codex comprise one or more execution instructions comprising an order of operations, an expected input, and an expected output.

CLAUSE 3. The computer-implemented method of any of clauses 1-2, wherein determining the evaluation tag further comprises:

- determining an intent of the query using an intent detection model;
- determining a generative context of the query, wherein the generative context comprises generative model tokens representing a conversation between the client device and the generative model; and
- comparing the intent of the query and the generative context of the query to expected inputs and expected generative contexts associated with the evaluation tags stored in the generative model functionality codex.

CLAUSE 4. The computer-implemented method of any of clauses 1-3, wherein combining the initial system prompt with the parameters of the evaluation tag corresponding to the query comprises associating the query with one or more execution instructions of the evaluation tag.

CLAUSE 5. The computer-implemented method of any of clauses 1-4, wherein generating the evaluation data object further comprises:

- generating, using the generative model, a generative output based on executing one or more execution instructions of the evaluation tag according to an order of operations; and
- determining an alignment score between the generative output and an expected output associated with the evaluation tag.

CLAUSE 6. The computer-implemented method of any of clauses 1-5, further comprising:

- generating, using the generative model, an explanation based on determining that an alignment score between a generative output of the generative model and an expected output associated with the evaluation tag does not satisfy an alignment threshold; and
- providing at least one of the generative output or the explanation for display on the client device.

CLAUSE 7. The computer-implemented method of any of clauses 1-6, further comprising:

- updating one or more execution instructions of the evaluation tag based on determining that an alignment score between a generative output of the generative model and an expected output associated with the evaluation tag does not satisfy an alignment threshold.
- generating, using the generative model, an additional generative output based on updating the one or more execution instructions; and
- determining an additional alignment score between the additional generative output and the expected output.

CLAUSE 8. The computer-implemented method of any of clauses 1-7, further comprising providing a generative output for display on the client device based on determining that an alignment score between the generative output of the generative model and an expected output associated with the evaluation tag satisfies an alignment threshold.

CLAUSE 9. A system comprising:

- at least one processor; and
- at least one non-transitory computer-readable storage medium storing instructions that, when executed by the at least one processor, cause the system to:
  - receive a query from a client device interacting with a generative model
  - determine one or more evaluation tags corresponding to the query by comparing the query with parameters of evaluation tags stored in a generative model functionality codex;
  - generate a modified system prompt for the generative model by combining an initial system prompt of the generative model with parameters of the one or more evaluation tags corresponding to the query; and
- generate, using the generative model to process the query and the modified system prompt, an evaluation data object indicating a measure of success by the generative model in responding to the query according to the one or more evaluation tags.

CLAUSE 10. The system of clause 9, further comprising instructions that, when executed by the at least one processor, cause the system to generate a generative output using an additional generative model different from the generative model generating the evaluation data object, wherein the evaluation data object corresponds to the generative output.

CLAUSE 11. The system of any of clauses 9-10, wherein the evaluation tags stored in the generative model functionality codex comprise two or more of:

intent tags comprising an objective;

behavior tags comprising one or more domain rules;

dependency tags comprising one or more prerequisite conditions for the generative model;

aspect tags comprising one or more constraints for the generative model;

tool tags comprising an indication of external tools or functions required to generate the evaluation data object; or quality tags comprising an expected output for the generative model.

CLAUSE 12. The system of any of clauses 9-11, further comprising instructions that, when executed by the at least one processor, cause the system to resolve, based on an order of priority, a conflict between a first evaluation tag and a second evaluation tag from among the one or more evaluation tags corresponding to the query.

CLAUSE 13. The system of any of clauses 9-12, further comprising instructions that, when executed by the at least one processor, cause the system to generate a layered evaluation tag by combining, based on an order of priority, one or more behavior tags corresponding to the query to an intent tag corresponding to the query.

CLAUSE 14. The system of any of clauses 9-13, further comprising instructions that, when executed by the at least one processor, cause the system to generate the modified system prompt by:

selecting an intent tag from the one or more evaluation tags corresponding to the query;

generating a layered evaluation tag by combining, based on an order of priority, one or more behavior tags from the one or more evaluation tags corresponding to the query to the selected intent tag;

generating execution instructions for the layered evaluation tag; and associating the execution instructions with the initial system prompt.

CLAUSE 15. A non-transitory computer-readable medium storing instructions thereon that, when executed by at least one processor, cause a computing device to:

receive a query from a client device interacting with a generative model;

determine an evaluation tag corresponding to the query by comparing the query with evaluation tags stored in a generative model functionality codex;

generate a modified system prompt for the generative model by combining an initial system prompt of the generative model with parameters of the evaluation tag corresponding to the query; and generate, using the generative model, an evaluation data object indicating a measure of success by the LLM in responding to the query according to the evaluation tag.

CLAUSE 16. The non-transitory computer-readable medium of clause 15, further storing instructions that, when executed by the at least one processor, cause the computing device to generate a function log of comparisons between the query and the evaluation tags stored in the generative model functionality codex.

CLAUSE 17. The non-transitory computer-readable medium of any of clauses 15-16, further storing instructions that, when executed by the at least one processor, cause the computing device to generate, using the generative model, a quality log comprising performance metrics including at least one of a latency measurement, token usage, computational cost, or an indication of whether the generative model satisfies a performance threshold in processing the query and the modified system prompt.

CLAUSE 18. The non-transitory computer-readable medium of any of clauses 15-17, further storing instructions that, when executed by the at least one processor, cause the computing device to provide a function log and a quality log associated with the initial system prompt to an execution instruction updater.

CLAUSE 19. The non-transitory computer-readable medium of any of clauses 15-18, further storing instructions that, when executed by the at least one processor, cause the computing device to:

generate, using the execution instruction updater, updated execution instructions based on analyzing the function log and the quality log; and update, based on the updated execution instructions, the evaluation tags stored in the generative model functionality codex.

CLAUSE 20. The non-transitory computer-readable medium of any of clauses 15-19, further storing instructions that, when executed by the at least one processor, cause the computing device to update the parameters of the evaluation tags stored in the generative model functionality codex by executing one or more update functions.

Figure 10:
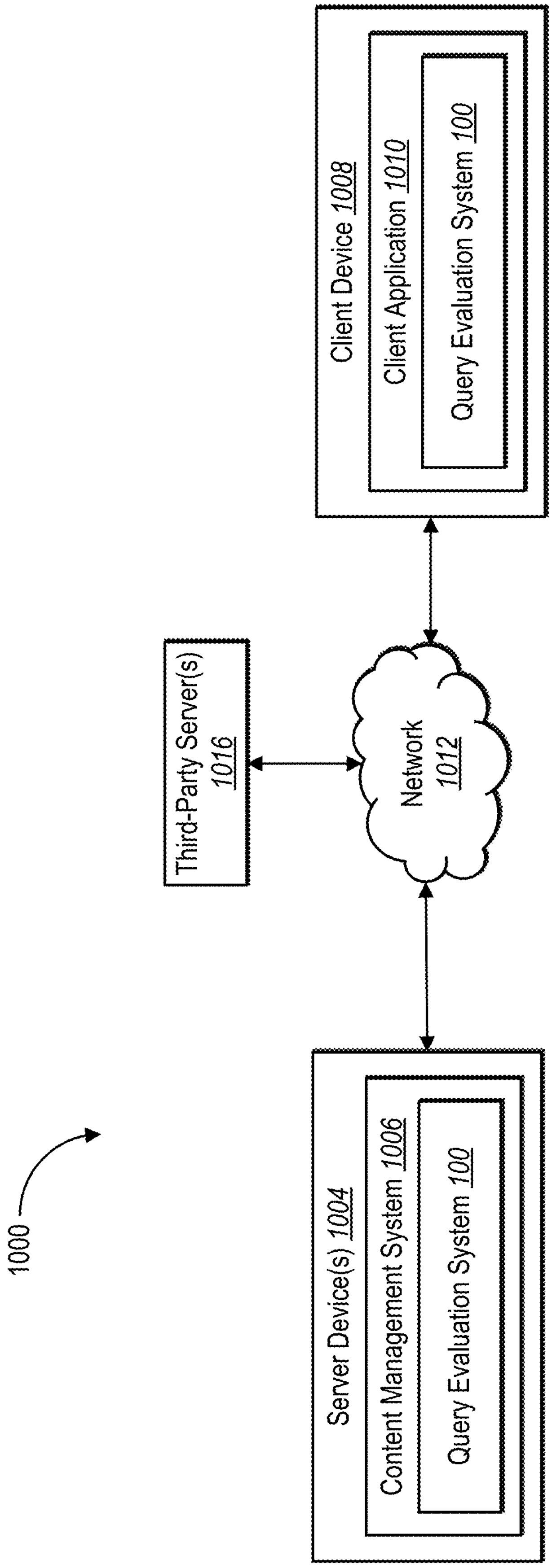
FIG. 10 illustrates a schematic diagram of an example environment of the query evaluation system in accordance with some embodiments.

Additional detail regarding the query evaluation system will now be provided with reference to the figures. For example, FIG. 10 illustrates a schematic diagram of an example system environment for implementing a query evaluation system 100 in accordance with one or more implementations.

As shown, the environment includes server device(s) 1004, a client device 1008 (e.g., the client devices described herein), third-party servers 1016 and a network 1012. Each of the components of the environment can communicate via the network 1012, and the network 1012 may be any suitable network over which computing devices can communicate. Example networks are discussed in more detail below in relation to FIGS. 11-12.

As mentioned above the example environment includes a client device 1008. The client device 1008 can be one of a variety of computing devices, including a smartphone, a tablet, a smart television, a desktop computer, a laptop computer, a virtual reality device, an augmented reality device, or another computing device as described in relation to FIGS. 11-12. The client device 1008 can communicate with the server device(s) 1004 via the network 1012. For example, the client device 1008 can receive user input from a user interacting with the client device 1008 (e.g., via a client application 1010) to, for instance, select or otherwise indicate a generative query, system prompt, modified system prompt, or generative output. In addition, the query evaluation system 100 on the server device(s) 1004 can receive information relating to various interactions with generative queries, system prompts, modified system prompts and/or generative outputs based on the input received by the client device 1008.

As shown, the client device can include a client application 1010. In particular, the client application 1010 may be a web application, a native application installed on the client device 1008 (e.g., a mobile application, a desktop application, etc.), or a cloud-based application where all or part of the functionality performed by the server device(s) 1004. Based on instructions from the client application 1010, the client device 1008 can present or display information, including a generative query, system prompt, modified system prompt, evaluation data object, or generative output.

As illustrated in FIG. 10, the example environment also includes the server device(s) 1004. The server device(s) 1004 may generate, track, store, process, receive, and transmit electronic data, such as digital content (e.g., content items), LLMs, prompts for LLMs, agentic subsystems, generative queries, system prompts, modified system prompts, evaluation data objects, generative outputs, LLM chat data, and/or interactions between user accounts on client devices. In addition, the server device(s) 1004 can transmit data to the client device in the form of generative outputs or notifications corresponding to system prompts or modified system prompts. Indeed, the server device(s) 1004 can communicate with the client device 1008 to send and/or receive data via the network 1012. In some implementations, the server device(s) 1004 include(s) a number of server devices distributed across the network 1012 and located in different physical locations. The server device(s) 1004 can comprise one or more content servers, application servers, communication servers, web-hosting servers, machine learnings servers, and other types of servers.

As shown in FIG. 10, the server device(s) 1004 can also include the query evaluation system 100 as part of the content management system 1006. The content management system 1006 can communicate with the client device 1008 to perform various functions associated with the client application 1010 such as managing user accounts, evaluating generative queries, generating modifying system prompts, generating evaluation data objects, generating generative outputs, and displaying generative outputs. Indeed, the content management system 1006 can include a network-based smart cloud storage system to manage, store, and maintain system prompts, generative queries, evaluation data objects, models, and related data across numerous user accounts, including user accounts in collaboration with one another.

Additionally, as shown in FIG. 10, the example environment includes third-party server(s) 1016. The third-party server(s) 1016 may generate, track, store, process, receive, and transmit electronic data, such as digital content (e.g., generative outputs), prompts for LLMs (e.g., responsive to a generative query), content of webpages, content of generative queries or system prompts and/or interactions between user accounts or client devices. In addition, the third-party server(s) 1016 can transmit data to the client device 1008 such as generative queries, evaluation data objects, or generative outputs to LLMs, modifications to fields of webpages and/or applications as part of saved states and/or interactions between user accounts or client devices. Indeed, the third-party server(s) 1016 can communicate with the client device 1008 to send and/or receive data via the network 1012. The third-party server(s) 1016 can comprise one or more content servers, application servers, communication servers, web-hosting servers, machine learning servers, and other types of servers. In some embodiments, the query evaluation system 100 can interface with the third-party servers 1016 to access, store, modify, or otherwise interact with generative queries.

Although FIG. 10 depicts the query evaluation system 100 located on the server device(s) 1004, in some implementations, the query evaluation system 100 may be implemented by (e.g., located entirely on or in part on) one or more other components of the environment. For example, the query evaluation system 100 may be implemented by the client device 1008 and/or a third-party device. For example, the client device 1008 can download all or part of the query evaluation system 100 for implementation independent of, or together with, the server device(s) 1004 and/or third-party server(s) 1016. Moreover, in some implementations, the query evaluation system 100 may solely generate a single scrollable page within a scroll navigation interface.

In some implementations, though not illustrated in FIG. 10, the environment may have a different arrangement of components and/or may have a different number or set of components altogether. For example, the client device 1008 may communicate directly with the query evaluation system 100, bypassing the network 1012. As another example, the environment can include a database located external to the server device(s) 1004 (e.g., in communication via the network 1012) or located on the server(s), on a third-party system, and/or on the client device 1008.

The components of the query evaluation system 100 can include software, hardware, or both. For example, the components of the query evaluation system 100 can include one or more instructions stored on a computer-readable storage medium executable by processors of one or more computing devices. When executed by one or more processors, the computer-executable instructions of the query evaluation system 100 can cause a computing device to perform the methods described herein. Alternatively, the components of the query evaluation system 100 can comprise hardware, such as a special processing device to perform a certain function or group of functions. Additionally or alternatively, the components of the query evaluation system 100 can include a combination of computer-executable instructions and hardware.

Furthermore, the components of the query evaluation system 100 performing the functions described herein may, for example, be implemented as part of a stand-alone application, as a module of an application, as a plug-in for applications including content management applications, as a library function or functions that may be called by other applications, and/or as a cloud-computing model. Thus, the components of the query evaluation system 100 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
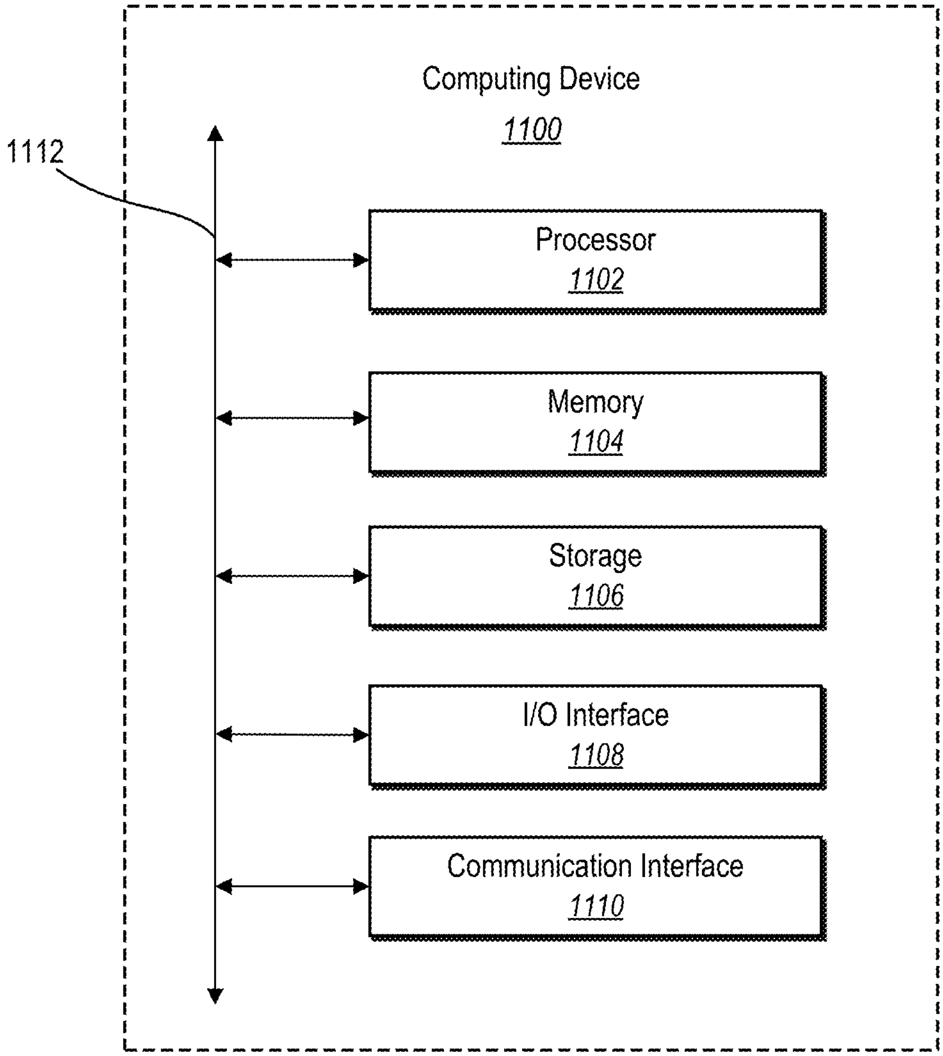
FIG. 11 illustrates a block diagram of a computing device for implementing one or more embodiments of the query evaluation system.

FIG. 11 illustrates a block diagram of exemplary computing device 1100 (e.g., the server device(s) 1004 and/or the client device 1008) that may be configured to perform one or more of the processes described above in accordance with one or more implementations. One will appreciate that server device(s) 1004 and/or the client device 1008 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 12:
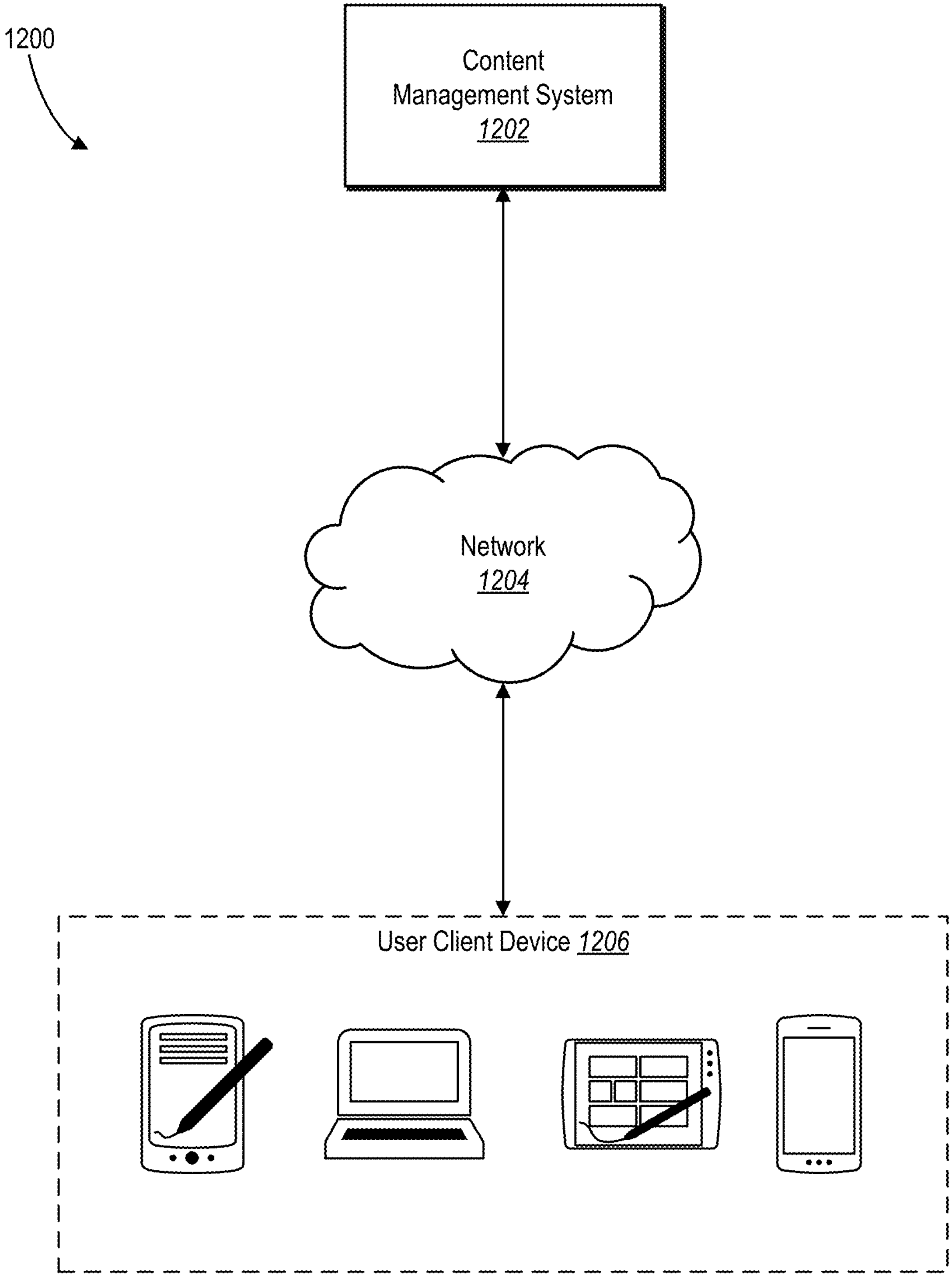
FIG. 12 illustrates an example environment of a content management system having the query evaluation system in accordance with one or more embodiments.

FIG. 12 is a schematic diagram illustrating environment 1200 within which one or more implementations of the query evaluation system 100 can be implemented. For example, the query evaluation system 100 may be part of a content management system 1202 (e.g., the content management system 1202). Content management system 1202 may generate, store, manage, receive, and send digital content (such as digital content items). For example, content management system 1202 may send and receive digital content to and from client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using client device 1206. The content management system 1202 can cause client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the number of resources used on client device 1206.

Client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving a query from a client device interacting with a generative model;

determining an evaluation tag corresponding to the query by comparing the query with parameters of evaluation tags stored in a generative model functionality codex;

generating a modified system prompt for the generative model by combining an initial system prompt of the generative model with parameters of the evaluation tag corresponding to the query;

generating, using the generative model to process the query and the modified system prompt, an evaluation data object indicating a measure of success by the generative model in generating an output responding to the query according to the evaluation tag;

generating an explanation by using the generative model to determine an alignment between the output and an expected output associated with the evaluation tag; and providing, in response to using the generative model to determine the alignment, the explanation for display at the client device.

2. The computer-implemented method of claim 1, wherein the parameters of the evaluation tags stored in the generative model functionality codex comprise one or more execution instructions comprising an order of operations, an expected input, and the expected output.

3. The computer-implemented method of claim 1, wherein determining the evaluation tag further comprises:

determining an intent of the query using an intent detection model;

determining a generative context of the query, wherein the generative context comprises generative model tokens representing a conversation between the client device and the generative model; and comparing the intent of the query and the generative context of the query to expected inputs and expected generative contexts associated with the evaluation tags stored in the generative model functionality codex.

4. The computer-implemented method of claim 1, wherein combining the initial system prompt with the parameters of the evaluation tag corresponding to the query comprises associating the query with one or more execution instructions of the evaluation tag.

5. The computer-implemented method of claim 1, wherein generating the evaluation data object further comprises:

generating, using the generative model, the output based on executing one or more execution instructions of the evaluation tag according to an order of operations; and determining an alignment score between the output and the expected output associated with the evaluation tag.

6. The computer-implemented method of claim 1, further comprising:

generating, using the generative model, the explanation based on determining that an alignment score between the output of the generative model and the expected output associated with the evaluation tag does not satisfy an alignment threshold; and providing the output and the explanation for display on the client device.

7. The computer-implemented method of claim 1, further comprising:

updating one or more execution instructions of the evaluation tag based on determining that an alignment score between the output of the generative model and the expected output associated with the evaluation tag does not satisfy an alignment threshold.

8. The computer-implemented method of claim 1, further comprising providing the output for display on the client device based on determining that an alignment score between the output of the generative model and the expected output associated with the evaluation tag satisfies an alignment threshold.

9. A system comprising:

at least one processor; and at least one non-transitory computer-readable storage medium storing instructions that, when executed by the at least one processor, cause the system to:

receive a query from a client device interacting with a generative model;

determine one or more evaluation tags corresponding to the query by comparing the query with parameters of evaluation tags stored in a generative model functionality codex;

generate a modified system prompt for the generative model by combining an initial system prompt of the generative model with parameters of the one or more evaluation tags corresponding to the query;

generate, using the generative model to process the query and the modified system prompt, an evaluation data object indicating a measure of success by the generative model in generating an output responding to the query according to the one or more evaluation tags;

generate an explanation by using the generative model to determine an alignment between the output and an expected output associated with the one or more evaluation tags; and provide, in response to using the generative model to determine the alignment, the explanation for display at the client device.

10. The system of claim 9, further comprising instructions that, when executed by the at least one processor, cause the system to generate an additional output using an additional generative model different from the generative model generating the evaluation data object, wherein the evaluation data object corresponds to the additional output.

11. The system of claim 9, wherein the evaluation tags stored in the generative model functionality codex comprise two or more of:

intent tags comprising one or more objectives;

behavior tags comprising one or more domain rules;

dependency tags comprising one or more prerequisite conditions for the generative model;

aspect tags comprising one or more constraints for the generative model;

tool tags comprising one or more indications of external tools or functions required to generate the evaluation data object; or quality tags comprising one or more expected outputs for the generative model.

12. The system of claim 9, further comprising instructions that, when executed by the at least one processor, cause the system to resolve, based on an order of priority, a conflict between a first evaluation tag and a second evaluation tag from among the one or more evaluation tags corresponding to the query.

13. The system of claim 9, further comprising instructions that, when executed by the at least one processor, cause the system to generate a layered evaluation tag by combining, based on an order of priority, one or more behavior tags corresponding to the query to an intent tag corresponding to the query.

14. The system of claim 9, further comprising instructions that, when executed by the at least one processor, cause the system to generate the modified system prompt by:

selecting an intent tag from the one or more evaluation tags corresponding to the query; generating a layered evaluation tag by combining, based on an order of priority, one or more behavior tags from the one or more evaluation tags corresponding to the query to the selected intent tag;

generating execution instructions for the layered evaluation tag; and associating the execution instructions with the initial system prompt.

15. A non-transitory computer-readable medium storing instructions thereon that, when executed by at least one processor, cause a computing device to:

receive a query from a client device interacting with a generative model;

determine an evaluation tag corresponding to the query by comparing the query with evaluation tags stored in a generative model functionality codex;

generate a modified system prompt for the generative model by combining an initial system prompt of the generative model with parameters of the evaluation tag corresponding to the query;

generate, using the generative model, an evaluation data object indicating a measure of success by the generative model in generating an output responding to the query according to the evaluation tag;

generate an explanation by using the generative model to determine an alignment between the output and an expected output associated with the evaluation tag; and provide, in response to using the generative model to determine the alignment, the explanation for display at the client device.

16. The non-transitory computer-readable medium of claim 15, further storing instructions that, when executed by the at least one processor, cause the computing device to generate a function log of comparisons between the query and the evaluation tags stored in the generative model functionality codex.

17. The non-transitory computer-readable medium of claim 15, further storing instructions that, when executed by the at least one processor, cause the computing device to generate, using the generative model, a quality log comprising performance metrics including at least one of a latency measurement, token usage, computational cost, or an indication of whether the generative model satisfies a performance threshold in processing the query and the modified system prompt.

18. The non-transitory computer-readable medium of claim 15, further storing instructions that, when executed by the at least one processor, cause the computing device to provide a function log and a quality log associated with the initial system prompt to an execution instruction updater.

19. The non-transitory computer-readable medium of claim 18, further storing instructions that, when executed by the at least one processor, cause the computing device to:

generate, using the execution instruction updater, updated execution instructions based on analyzing the function log and the quality log; and update, based on the updated execution instructions, the evaluation tags stored in the generative model functionality codex.

20. The non-transitory computer-readable medium of claim 15, further storing instructions that, when executed by the at least one processor, cause the computing device to update the parameters of the evaluation tags stored in the generative model functionality codex by executing one or more update functions.

* * * * *